(12) United States Patent
Herr et al.

(10) Patent No.: US 9,498,401 B2
(45) Date of Patent: Nov. 22, 2016

(54) ROBOTIC SYSTEM FOR SIMULATING A WEARABLE DEVICE AND METHOD OF USE

(71) Applicant: Massachusetts Institute of Technology, Cambridge, MA (US)

(72) Inventors: Hugh M. Herr, Somerville, MA (US); Jiun-Yih Kuan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 901 days.

(21) Appl. No.: 13/722,246

(22) Filed: Dec. 20, 2012

(65) Prior Publication Data
US 2013/0158444 A1 Jun. 20, 2013

Related U.S. Application Data

(60) Provisional application No. 61/578,177, filed on Dec. 20, 2011.

(51) Int. Cl.
*G06F 19/00* (2011.01)
*A61H 3/00* (2006.01)
(Continued)

(52) U.S. Cl.
CPC .............. *A61H 3/00* (2013.01); *A61H 1/0255* (2013.01); *A61H 1/0262* (2013.01);
(Continued)

(58) Field of Classification Search
CPC .... A61H 1/0255; A61H 1/0266; A61H 3/00; A61H 1/0262; A63B 23/03508; A63B 23/047; A63B 21/00178; A63B 21/4011; A63B 21/4047; A63B 22/0235; A63B 23/03541; A63B 21/00181; A63B 21/008; A63B 21/4025; B25J 9/0006

USPC ....... 700/245, 247, 251, 257, 258, 260, 261; 601/23

See application file for complete search history.

(56) References Cited

U.S. PATENT DOCUMENTS

| 420,179 A | 1/1890 | Yagn |
|---|---|---|
| 438,830 A | 10/1890 | Yagn |

(Continued)

FOREIGN PATENT DOCUMENTS

| DE | 102 19 662 A1 | 11/2003 |
|---|---|---|
| GB | 2 260 083 A | 4/1993 |

(Continued)

OTHER PUBLICATIONS

Asbeck, A.T., et al., "Biologically-inspired Soft Exosuit", *2013 IEEE Int'l Conf. on Rehabilitation Robotics*, Jun. 24-26, 2013.

(Continued)

*Primary Examiner* — Jaime Figueroa
(74) *Attorney, Agent, or Firm* — Hamilton, Brook, Smith & Reynolds, P.C.

(57) ABSTRACT

A robotic system for simulating a wearable device actuation delivery mechanism and the source removed from the actuation delivery mechanism that is linked to the actuation delivery mechanism by at least one cable. A sensing system detects a physiological feature of the subject and, based on feedback from the sensing system, a control system linked to both the sensing system and the actuation source modulates the actuation source, and thereby modulating actuation of the joint of a subject in response to the physiological future sensed by the sensing system. A method for simulating a wearable robotic system employs the robotic system of the invention to thereby provide a model on which to base design of an ambulatory prosthetic for a subject.

35 Claims, 19 Drawing Sheets

(51) Int. Cl.
| | |
|---|---|
| A61H 1/02 | (2006.01) |
| A63B 22/02 | (2006.01) |
| A63B 23/035 | (2006.01) |
| A63B 23/04 | (2006.01) |
| B25J 9/00 | (2006.01) |
| A63B 21/00 | (2006.01) |
| A63B 21/008 | (2006.01) |

(52) U.S. Cl.
CPC ......... *A61H 1/0266* (2013.01); *A63B 21/008* (2013.01); *A63B 21/00178* (2013.01); *A63B 21/00181* (2013.01); *A63B 21/4011* (2015.10); *A63B 21/4025* (2015.10); *A63B 21/4047* (2015.10); *A63B 22/0235* (2013.01); *A63B 23/03508* (2013.01); *A63B 23/03541* (2013.01); *A63B 23/047* (2013.01); *B25J 9/0006* (2013.01); *A61H 1/0277* (2013.01); *A61H 1/0281* (2013.01); *A61H 1/0285* (2013.01); *A61H 1/0288* (2013.01); *A61H 2201/1238* (2013.01); *A61H 2201/165* (2013.01); *A61H 2201/1642* (2013.01); *A61H 2201/1676* (2013.01); *A61H 2201/5061* (2013.01); *A61H 2201/5064* (2013.01); *A61H 2201/5071* (2013.01); *A61H 2230/06* (2013.01); *A61H 2230/50* (2013.01); *A61H 2230/60* (2013.01); *A63B 2220/10* (2013.01); *A63B 2220/51* (2013.01); *A63B 2220/56* (2013.01); *A63B 2220/803* (2013.01); *A63B 2220/805* (2013.01); *A63B 2230/06* (2013.01); *A63B 2230/50* (2013.01); *A63B 2230/60* (2013.01)

(56) References Cited

U.S. PATENT DOCUMENTS

| | | | |
|---|---|---|---|
| 440,684 | A | 11/1890 | Yagn |
| 3,449,769 | A | 6/1969 | Mizen |
| 4,986,280 | A | 1/1991 | Marcus et al. |
| 5,016,869 | A | 5/1991 | Dick et al. |
| 6,719,671 | B1 | 4/2004 | Böck |
| 6,741,911 | B2 | 5/2004 | Simmons |
| 7,313,463 | B2 | 12/2007 | Herr et al. |
| 8,244,402 | B2 | 8/2012 | Wells et al. |
| 8,483,816 | B1* | 7/2013 | Payton ............... A61B 5/04 600/544 |
| 8,500,823 | B2 | 8/2013 | Herr et al. |
| 8,512,415 | B2 | 8/2013 | Herr et al. |
| 8,801,641 | B2* | 8/2014 | Kazerooni ............ A61H 3/008 128/898 |
| 8,945,028 | B2* | 2/2015 | Kazerooni ............ A61H 3/00 601/23 |
| 9,060,884 | B2* | 6/2015 | Langlois ............... A61F 2/68 |
| 2004/0127825 | A1 | 7/2004 | Castillo |
| 2006/0004307 | A1 | 1/2006 | Horst |
| 2006/0150753 | A1* | 7/2006 | Massimo ............. B25J 9/0006 73/865.4 |
| 2006/0211956 | A1 | 9/2006 | Sankai |
| 2008/0009771 | A1* | 1/2008 | Perry .................. B25J 9/0006 600/587 |
| 2009/0055019 | A1* | 2/2009 | Stiehl .................. B25J 9/1671 700/249 |
| 2010/0241242 | A1 | 9/2010 | Herr et al. |
| 2010/0324699 | A1 | 12/2010 | Herr et al. |
| 2011/0040216 | A1 | 2/2011 | Herr et al. |
| 2011/0264230 | A1 | 10/2011 | Herr et al. |
| 2012/0179075 | A1* | 7/2012 | Perry .................. B25J 9/0006 601/33 |
| 2013/0150761 | A1 | 6/2013 | Romo |
| 2013/0158444 | A1 | 6/2013 | Herr et al. |
| 2013/0197318 | A1 | 8/2013 | Herr et al. |
| 2013/0282141 | A1 | 10/2013 | Herr et al. |
| 2013/0289452 | A1 | 10/2013 | Smith et al. |
| 2013/0296746 | A1 | 11/2013 | Herr et al. |
| 2013/0310979 | A1 | 11/2013 | Herr et al. |
| 2015/0173929 | A1 | 6/2015 | Kazerooni et al. |
| 2015/0209214 | A1 | 7/2015 | Herr |

FOREIGN PATENT DOCUMENTS

| | | |
|---|---|---|
| WO | WO 2009/149206 A2 | 12/2009 |
| WO | WO 2010/088635 | 8/2010 |
| WO | WO 2012/175211 A1 | 12/2012 |
| WO | WO 2013/142343 | 9/2013 |
| WO | WO 2014/151065 A2 | 9/2014 |
| WO | WO 2015/095211 A2 | 6/2015 |

OTHER PUBLICATIONS

International Search Report and Written Opinion of the International Searching Authority, PCT/US2014/070636, "Optimal Design of a Lower Limb Exoskeleton or Orthosis", date of mailing Aug. 25, 2015.

Wehner, M., et al., "A Lightweight Soft Exosuit for Gait Assistance", 2013 *IEEE Int'l Conf. on Robotics and Automation(ICRA)*, May 6-10, 2013.

Bogue, R. "Exoskeletons and Robotic Prosthetics: A Review of Recent Developments,"*Industrial Robot: An International Journal*, 36(5): 421-427 (2009).

Cherry, M.S. et al., "An Elastic Exoskeleton for Assisting Human Running," in *Proceedings of the ASME 2009 International Design Engineering Technical Conferences & Computers and Information in ENgineering Conference*, pp. 1-12 (2009).

Cyberdyne, "What's 'HAL' (Hybrid Assistive Limb®)?" Available at: http://www.cyberdyne.jp/english/robotsuithal/ (Retrieved from Internet on Jan. 14, 2014).

Grabowski, A.M., and Herr H.M., "Leg Exoskeleton Rduces the Metabolic Cost of Human Hopping," *Journal of Applied Physiology*, 107: 670-678 (2009).

Karlin, S., "Raiding Iron Man's Closet," *IEEE Spectrum*,.48(8), p. 25 (Aug. 2011).

Kazerooni, H, et al., "On The Control of the Berkeley Lower Extremity Exoskeleton (BLEEX)," in *Proceedings of IEEE International Conference on Robotics and Automation*, pp. 4353-4360 (Aug. 2005).

Kuan, J. (Jarvis), et al., "Tethered Wearable Robot System for Augmentation and Rehabilitation," Biomechatronics Group, Media Lab, Massachusetts Institute of Technology, (Nov. 6, 2012).

Lockheed Martin, Product Finder, Press Releases, "HULC", Available at: http://www.lockheedmartin.com/products/hulc/ (Retrieved from the Internet on Jan. 15, 2014).

PRNewswire, Raytheon Unveils Lighter, Faster, Stronger Second Generation Exoskeleton Robotic Suit (Sep. 27, 2010; Available at: http://multivu.prnewswire.com/mnr/raytheon/46273 (Retrieved from the Internet on Jan. 21, 2014).

Walsh, C.J., et al., "A Quasi-Passive Leg Exoskeleton for Load-Carrying Augmentation," *International Journal of Humanoid Robotics*, 4: 487-506 (2007).

Zelinsky, A., "Robot Suit Hybrid Assistive Limb," *IEEE Robotics & Automation Magazine*, 16(4): pp. 98 and 102 (2009).

Alexander, R. M., "Energy-saving mechanisms in walking and running," *Journal of Experimental Biology*, 160:55- 69 (1991).

Au, S. K., et al., "Biomechanical Design of a Powered Ankle-Foot Prosthesis," Proceedings IEEE 10$^{th}$ International Conference on Rehabilitation Robotics, Noordwijk, The Netherlands (Jun. 2007).

Au, S. K., et al., "Powered Ankle-Foot Prosthesis for the Improvement of Amputee Ambulation," 29$^{th}$ IEEE Conference, Lyon, France (Aug. 2007).

Au, S., "Powered ankle-foot prosthesis for the improvement of amputee walking economy," Doctoral dissertation, Massachusetts Institute of Technology (2007).

Belli, A., et al., "Moment and power of lower limb joints in running," *International Journal of Sports Medicine*, 23:136-141 (2002).

(56) References Cited

OTHER PUBLICATIONS

Biewener, A. A., "Muscle function *in vivo*: A comparison of muscles used for elastic energy savings versus muscles used to generate mechanical power," *American Zoology*, 38:703-717 (1998).
Blaya, J. A. and Herr, H., "Adaptive control of a variable-impedance ankle-foot orthosis to assist drop-foot gait," IEEE Transactions on Neural Systems & Rehabilitation Engineering.12(1):24-31 (2004).
Brockway, J. M., et al., "Derivation of formulae used to calculate energy expenditure in man," *Human Nutrition Clinical Nutrition*, 41:463-471 (1987).
Cavagna, G. A., "Force platforms as ergometers," *Journal of Applied Physiology*, 39(1):174-179 (1985).
Cavagna, G. A., et al., "Mechanical work in terrestrial locomotion: Two basic mechanisms for minimizing energy expenditure," *American Journal of Physiology Regulatory, Integrative, and Comparative Physiology*, 233:243-261 (1977).
Clancy, E. A., et al., "Sampling, noise-reduction, and amplitude estimation issues in surface electromyography," *Journal of Electromyography and Kinesiology*, 12:1-6 (2002).
Collins, J. A., "*Mechanical Design of Machine Elements and Machines*," John Wiley and Sons, Hoboken, N. J., Table of Contents (2003).
Cram, J. R., et al., "*Introduction to Surface Electromyography*," Aspen Publishers, Inc., Table of Contents (1998).
Dollar, A. M. and Herr, H., "Active orthoses for the lower-limbs—Challenges and state of the art," *Proceedings of the 2007 IEEE International Conference on Rehabilitation Robotics (ICORR)*, Noordwijk, Netherlands, pp. 968-977, Jun. 2007.
Dollar, A. M. and Herr, H., "Design of a quasi-passive knee exoskeleton to assist running," Proceedings of the 2008 IEEE/RSJ International Conference on Intelligent Robots and Systems, Nice, France, Sep. 2008.
Dollar, A. M. and Herr, H., "Lower extremity exoskeletons and active Orthoses," Challenges and state-of-the-art, *IEEE Transactions on Robotics*, 24(1):144-158 (2008).
Elliott, G. A.. "Design and Evaluation of a Quasi-Passive Robotic Knee Brace: On the Effects of Parallel Elasticity on Human Running." Doctoral dissertation, Massachusetts Institute of Technology (2012).
Elliott, G. et al., "The Biomechanics and Energetics of Human Running using an Elastic Knee Exoskeleton," *International Conference on Rehabilitation Robotics* (2013).
Farley, C. T. and Ferris, D.P., "Biomechanics of walking and running: From center of mass movement to muscle action," *Exercise and Sport Sciences Reviews*, 26(1):253-285 (1998).
Farley, C. T. and Gonzalez, O., "Leg stiffness and stride frequency in human running," *Journal of Biomechanics*, 29(2):181-186 (1996).
Farris, D. J. and Sawicky, G. S., "The mechanics and energetics of human walking and running. A joint level perspective," *Journal of the Royal Society Interface*, 9(66): 110-118 (2012).
Ferris, D. P., "Running in the real world: Adjusting leg stiffness for different surfaces," *Proceedings Biological Sciences*, 265: 989-994 (1998).
Ferris, D. P., et al., "Neuromechanical adaptation to hopping with an elastic ankle-foot orthosis," *Journal of Applied Physiology*, 100: 163-170 (2006).
Ferris, D. P., et al., "Runners adjust leg stiffness for their first step on a new running surface," *Journal of Biomechanics*, 32:787-794 (1999).
He, J., et al., "Mechanics of running under simulated low gravity," *Journal of Applied Physiology*, 71:863-870 (1991).
Herr, H. and Langman, N., "Optimization of human-powered elastic mechanisms for endurance amplification," *Structural Optimization*, 13(1): 65-67 (Feb. 1997).
Herr, H. M. et al. "Patient-adaptive prosthetic and orthotic leg systems," Proceedings of the 12th Nordic Baltic Conference on Biomedical Engineering and Medical Physics, Reykjavik, Iceland, pp. 123-128 (Jun. 2002).
Herr, H., "The new bionics that let us run, climb and dance", TED 2014; Filmed Mar. 2014; Available at: https://www.ted.com/talks/hugh_her_the_new_bionics_that_let_us_run_climb_and_dance (Retrieved from the Internet on Apr. 15, 2015).
Herr, H., "Exoskeletons and orthoses: classification, design challenges and future directions," *Journal of NeuroEngineering and Rehabilitation*, 6(1): (2009).
HULC-Lockheed Martin, www.lockheedmartin.com/us/products/hulc.html (Downloaded Jan. 15, 2014).
Kawamoto, H. and Sankai, Y., "Power assist method based on phase sequence and muscle force condition for HAL," *Advanced Robotics*, 19 (7):717- 734 (2005).
Kazerooni, H. and Kim, S., "Contact instability of the direct drive robot when constrained by a rigid environment," In *ASME Winter Annual Meeting*, (1989).
Kerdok, A. E., et al., "Energetics and mechanics of human running on surfaces of different stiffnesses," *Journal of Applied Physiology*, 92:469- 478 (2002).
Kuan, J. et al., "Design of a Knee Joint Mechanism that Adapts to Individual Physiology", *Engineering in Medicine and Biology Society (EMBS)*, 2014, 36th Annual Conference of the IEEE, pp. 2061-2064 (Aug. 26-30, 2014).
Lee, C. R. and Farley, C.T., "Determinants of the center of mass trajectory in human walking and running," *Journal of Experimental Biology*, 201: 2935- 2944 (1998).
Martinez-Villalpando, E. C., "Design and Evaluation of a Biomimetic Agonist-Antagonist Active Knee Prosthesis." Doctoral dissertation, Massachusetts Institute of Technology (2012).
Martinez-Villalpando, E. C., et al., "Design of an agonist-antagonist active knee prosthesis," IEEE conference, *Biomedical Robotics and Biomechatronics*, Scottsdale, AZ (Oct. 2008).
McMahon, T. A. and Cheng, G. C., "The mechanics of running: How does stiffness couple with speed?" *Journal of Biomechanics*, 23(1):65-78 (1990).
McMahon, T. A., "*Muscles, Reflexes, and Locomotion,* " Princeton University Press, Princeton, N.J., Table of Contents (1984).
Merletti, R., Standards for reporting EMG data, Technical report, Politecnico di Torino (1999).
Mooney, L. M. et al., "Autonomous exoskeleton reduces metabolic cost of human walking during load carriage", *Journal of NeuroEngineering and Rehbilitation*, 11: 80 (2014).
Mosher, R. S., "Handyman to Hardiman," Teclmical report, General Electric Research and Development Center (1967).
Munro, C. F., et al., "Ground reaction forces in running a reexamination," *Journal of Biomechanics*, 20(2):147- 155 (1987).
Non-Final Office Action mailed Mar. 7, 2016 for U.S. Appl. No. 13/774,774.
Non-Final Office Action mailed on Dec. 4, 2015 for U.S. Appl. No. 13/722,246, entitled "A Robotic System for Simulating a Wearable Device and Method of Use."
Novacheck, T. F., "The biomechanics of running", *Gait and Posture*, 7: 77- 95 (1998).
Pratt, G. A. and Williamson, M. M., "Series elastic actuators," in *IEEE International Conference on Intelligent Robots and Systems*, 1:399- 406 (1995).
Sawicki, G. S. and Ferris, D. P., "Mechanics and energetics of incline walking with robotic ankle exoskeletons," *The Journal of Experimental Biology*, 212:32- 41 (2008).
Stock Drive Products, *Elements of Metric Gear Technology*, New Hyde Park, NY, at least as early as Jan. 15, 2014.
Valiente, A., "Design of a quasi-passive parallel leg exoskeleton to augment load carrying for walking," Master's thesis, Massachusetts Institute of Technology (2005).
Walsh C. J., et al., "Development of a lightweight, underactuated exoskeleton for load-carrying augmentation," *Proceedings of the IEEE International Conference on Robotics and Automation*, Orlando, FL, (May 2006).
Walsh, C. J. et al., "An autonomous, underactuated exoskeleton for load-carrying augmentation," *IEEE/RSJ International Conference on Intelligent Robots and Systems (IROS)*, Beijing, China, Oct. 2006.

(56) References Cited

OTHER PUBLICATIONS

Walsh, C. J., "Biomimetic design of an under-actuated leg exoskeleton for load-carrying augmentation," Master's thesis, Massachusetts Institute of Technology (2006).
Wiggin, M. B., et al., "An exoskeleton using controlled energy storage and release to aid ankle propulsion," In *2011 IEEE International Conference on Rehabilitation Robotics Rehab Week*, Zurich, Switzerland (Jun. 29-Jul. 1, 2011).
Zoss, A., et al., On the mechanical design of the Berkeley lower extremity exoskeleton (BLEEX), In *IEEE International Conference on Intelligent Robots and Systems* (2005).
Caputo, J. M. and Collins, S. H. (Aug. 2012) An externally powered and controlled ankle-foot prosthesis for use in push-off experiments. In American Society of Biomechanics, 2012 Annual meeting of.—Poster.†
Caputo, J. M., and Collins, S. H. (Aug. 2011) An externally powered and controlled ankle-foot prosthesis for use in push-off experiments. In American Society of Biomechanics, 2012 Annual meeting of.—Abstract.†
Jackson, R.W. and Collins S.H. (May 2012) Targeting specific muscles for rehabilitation with an EMG-controlled ankle-foot orthesis. In Dynamic Walking, 2012 International Conference on.—Slides.†
Jackson, R.W. and Collins S.H. (May 2012) Targeting specific muscles for rehabilitation with an EMG-controlled ankle-foot orthesis. In Dynamic Walking, 2012 International Conference on.—Abstract.†
Caputo, J. M., and Collins, S. H. (Jul. 2011) Externally powered and controlled ankle-foot prosthesis. In Dynamic Walking, 2011 International Conference on.—Poster.†
Caputo, J. M., and Collins, S. H. (Jul. 2011) Externally powered and controlled ankle-foot prosthesis. In Dynamic Walking, 2011 International Conference on.—Abstract.†
Collins, S. H. (2011, Jul.) Exploring ankle control strategies with an experimental biomechatronic testbed. In Dynamic Walking, 2011 International Conference on.—Slides.†
Collins, S. H. (Jul. 2011) Exploring ankle control strategies with an experimental biomechatronic testbed. In Dynamic Walking, 2011 International Conference on.—Abstract.†
Sulzer, J. S., Roiz, R. A., Peshkin, M. A., & Patton, J. L. (2009). A highly backdrivable, lightweight knee actuator for investigating gait in stroke. Robotics, IEEE Transactions on, 25(3), 539-548.†
Schiele, A. Fundamentals of Ergonomic Exoskeleton Robots. (Doctoral dissertation, Ph. D. Thesis Delft: Delft University of Technology, 2008, available at: www.library.tudelft.nl).†
Veneman, J. F. (2007). Design and evaluation of the gait rehabilitation robot LOPES. University of Twente. PhD Dissertation.†
Sawicki, G. S., Gordon, K. E., & Ferris, D. P. (Jul. 2005). Powered lower limb orthoses: applications in motor adaptation and rehabilitation. In Rehabilitation Robotics, 2005. ICORR 2005. 9th International Conference on (pp. 206-211). IEEE.†
Andersen, J. B., & Sinkjr, T. (2003). Mobile ankle and knee perturbator.Biomedical Engineering, IEEE Transactions on, 50(10), 1208-1211.†
Andersen, J. B., & Sinkjær, T. (1995). An actuator system for investigating electrophysiological and biomechanical features around the human ankle joint during gait. Rehabilitation Engineering, IEEE Transactions on, 3(4), 299-306.†
Abul-Haj, C., & Hogan, N. (1987). An emulator system for developing improved elbow-prosthesis designs. Biomedical Engineering, IEEE Transactions on, (9), 724-737.†
Flowers, W.C. (1973). A man-interactive simulator system for above-knee prosthetics studies. Doctoral dissertation, Massachusetts Institute of Technology.†

\* cited by examiner
† cited by third party

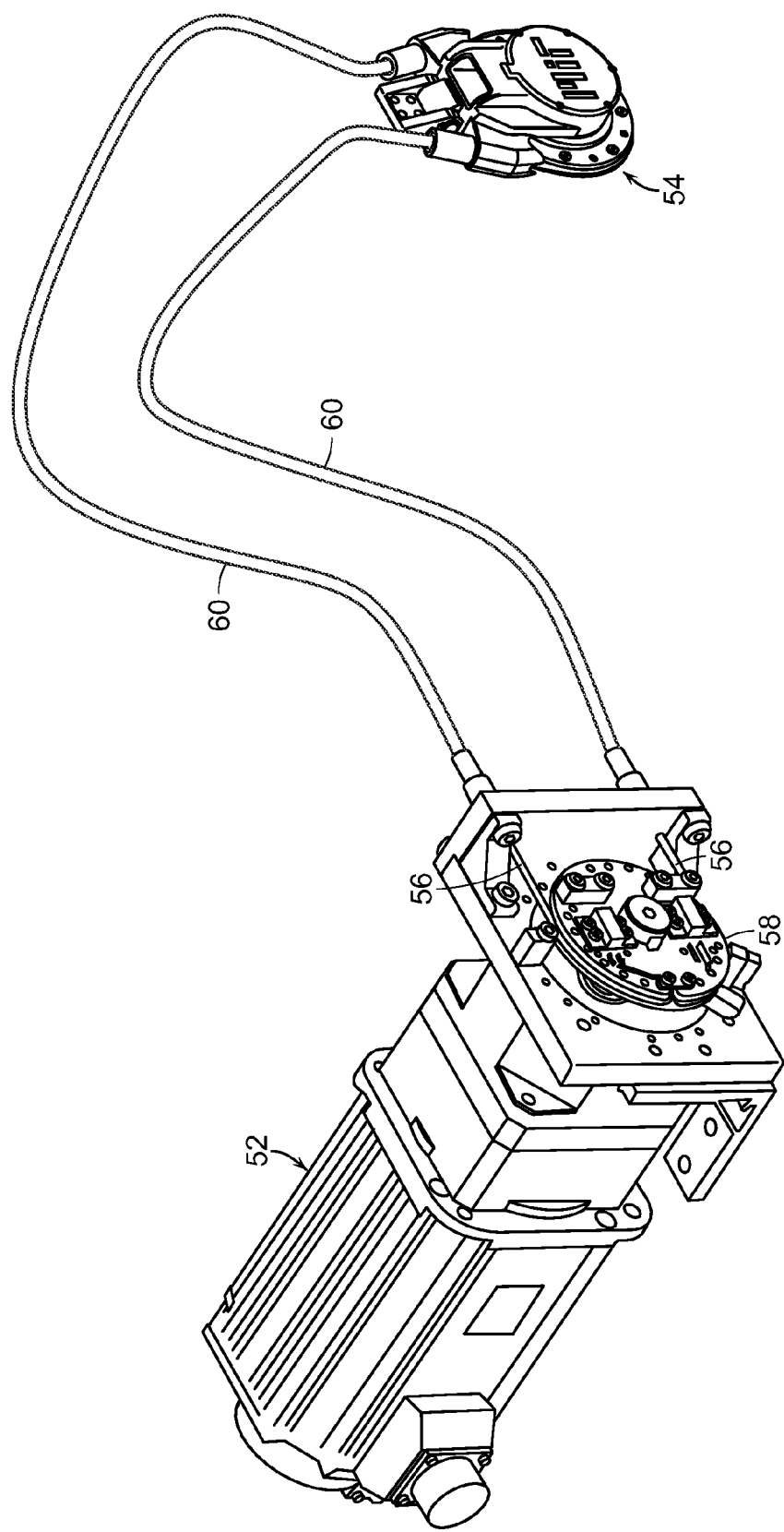

ROBOTIC SYSTEM FOR SIMULATING A WEARABLE DEVICE AND METHOD OF USE

This application claims the benefit of U.S. Provisional Application No. 61/578,177, filed on Dec. 20, 2011, the relevant teachings of which are incorporated herein in their entirety.

BACKGROUND OF THE INVENTION

Successful human augmentation has been a goal for several decades. However, researchers and engineers are still attempting to design an efficient extremity exoskeleton system that can enhance an able-bodied person's power and mobility, a promising prosthesis, or an effective rehabilitation device than can restore normal function to those with a disability. Such devices would have to generate either assistive or resistive force on a human body to perform normal functions.

Typically, neither active nor passive wearable robots, such as active lower-extremity exoskeletons in [1-4] or passive and quasi-passive exoskeletons in [5-7], demonstrate a significant metabolic advantage for legged locomotion. One possible explanation is that it is not yet completely known what functions are needed from a wearable device to appropriately assist a human during natural locomotion. Moreover, early innovations in prosthetic designs have focused on biomimetic appearance, whereas recent innovations strive to replicate biomimetic functions.

Development of an exoskeleton capable of providing the wide range of functions necessary to successfully replicate or augment human locomotion provides many challenges. For example, existing wearable devices may contain either or both active and passive components. Active components, while versatile in function, usually require power supplies, actuators, and transmissions that come with a cost of high weight and low efficiency. The power and energy density of such devices are therefore limited. In contrast, underactuated devices limit the need for active systems by employing passive and quasi-passive elements. However, such designs are limited in their function, as they can only exhibit the behaviors associated with their designed components. Hence, it is difficult to achieve a variety of biological-like mechanisms of complex human locomotion in a portable package.

Therefore, a need exists for a device and method for simulating a wearable device that overcomes or minimizes the above-referenced problems.

SUMMARY OF THE INVENTION

This invention relates generally to a robotic system for simulating a wearable device and a method for simulating the wearable robotic device.

In one embodiment, the invention is a robotic system for simulating a wearable device, including an actuation delivery mechanism suitable for fitting to a subject and capable of delivering force to a prosthesis or physiologic joint of the subject. An actuation source is remote from the actuation delivery mechanism and at least one cable links the actuation source to the actuation delivery mechanism, whereby force can be transmitted between the actuation source and the actuation delivery mechanism. A sensing system of the robotic system that detects a physiological feature of the subject is linked to a control system, which is linked, in turn, to the actuation source, whereby the control system modulates the actuation source and, consequently, modulates actuation of the joint in response to the physiological feature sensed by the sensing system.

In another embodiment, the invention is a method for simulating a wearable robotic device that includes the steps of fitting an actuation delivery mechanism to a subject. The actuation system is capable of delivering force to a prosthetic or physiological joint of the subject, and is linked by at least one cable to an actuation source remote from the actuation delivery mechanism, whereby force is transmitted between the actuation source and the actuation delivery mechanism. The method further includes sensing at least one physiological feature of the subject while the subject or the actuation source is moving the joint, and modulating the actuation source to thereby modulate the actuation delivery mechanism and consequently modulate actuation of the joint in response to the physiological feature sensed.

This invention has many advantages. For example, the actuation source employed by the robotic system of the invention is remote from the actuation delivery mechanism, thereby reducing the weight typically associated with motors powerful enough to deliver sufficient force to an actuation delivery mechanism fitted to a subject. By reducing the weight of the portions of the invention fitted to the subject, the subject is able to provide a much more natural gait during walking or running for modeling purposes. In addition, the robotic system and method of the invention enable an iterative process that allows modulation of force delivered to the actuation delivery mechanism fitted to the subject in response to feedback provided by sensors detecting physiological features of the subject during walking or running Such iterative feedback allows the control system of the robotic system and method of the invention to much more accurately and rapidly model exoskeletons, orthoses and prostheses wearable by a subject that substitute for or assist ankle, knee and hip joints of a subject in need of assistance. In addition, a plurality of actuation delivery mechanisms and respective actuation sources can be employed in coordination with each other, each actuation delivery mechanism and respective actuation source representing a degree of freedom.

At least six degrees of freedom can be employed with a single subject, thereby enabling virtually complete replication of the physiological gait of a walking or running subject. The robotic system and method of the invention can be employed to tailor exoskeletons, orthoses and prostheses to the gait of an individual subject by using the data obtained by the robotic system and the method of the invention to program onboard computers of wearable mobile exoskeletons, orthoses and prostheses. Further, the six degrees of freedom can be fitted to either physiological or artificial joints of a subject to thereby model the forces needed to replicate a normal human gait.

Although discussed primarily with respect to ankle, knee and hip joints, the robotic system and method of the invention can be applied to model and replicate other joints, such as finger, thumb, wrist, elbow, shoulder and any other dynamic relation among skeletal components. Also, the robotic system of the invention may be used for researching biological properties of human locomotion, testing hypotheses concerning wearable robotic interventions, and realizing different kinds of rehabilitation strategies. Therefore, it can be used as a tool to develop exoskeletal, orthotic or prosthetic devices, or to develop rehabilitation strategies. Moreover, the robotic system of the invention can be used as a body training machine since it can realize any training strategy while measuring simultaneously biological data.

These features are ideal for professional athletes or amateurs to gain optimized training results.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a perspective representation of an actuation source, an actuation delivery mechanism and cables connecting the actuation source and the actuation delivery mechanism of the invention.

FIG. 5E is a detail of the circled portion of FIG. 5B showing a moving hard stop colliding with a fixed hard stop 150a.

DETAILED DESCRIPTION OF THE INVENTION

The invention generally is directed to a robotic system for simulating a wearable device and to a method for simulating a wearable robotic device.

Figure 1:
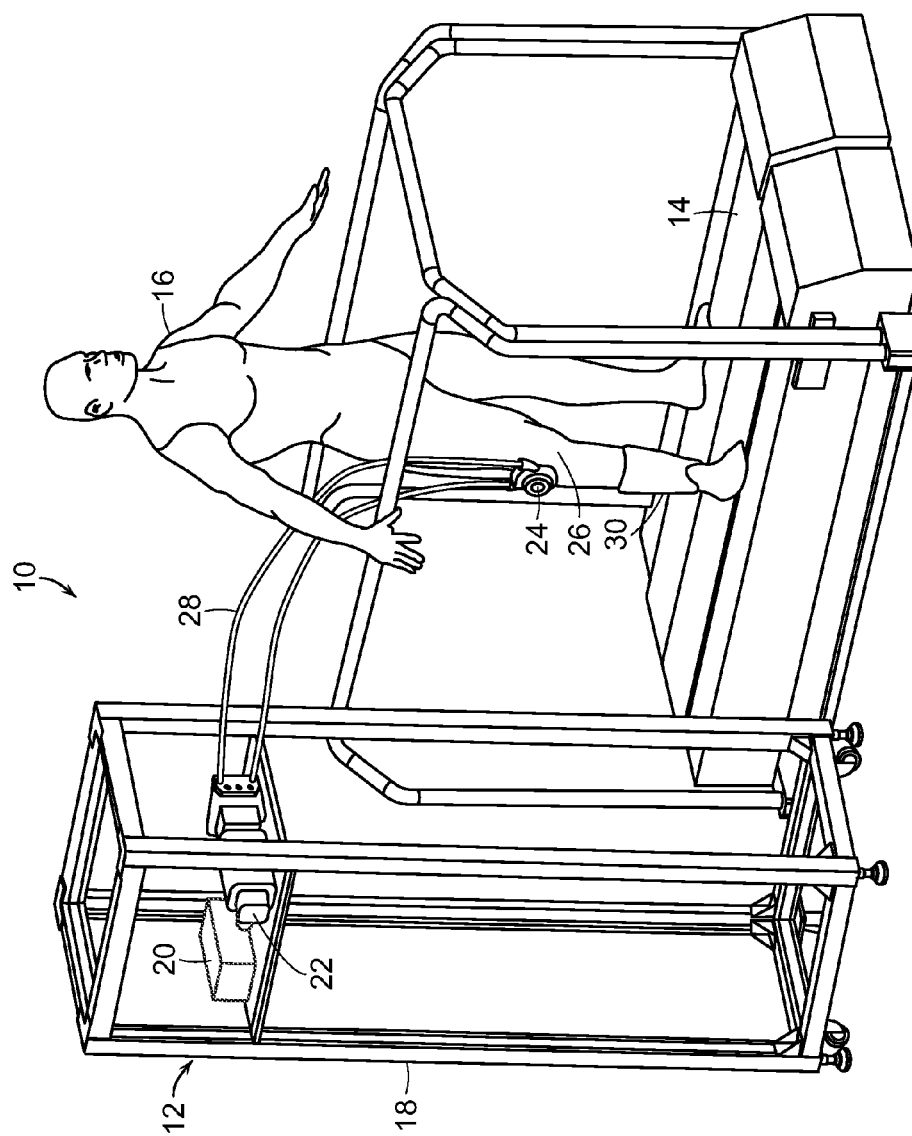
FIG. 1 is a perspective representation of one embodiment of a robotic system for simulating a wearable device of the invention having a single degree of freedom.

One embodiment of a robotic system for simulating a wearable device of the invention is shown in FIG. 1. As represented therein, robotic system 10 includes a suitable support, such as stand 12. Stand 12 includes treadmill 14. Optionally, force sensors or pressure sensors (not shown) detect footsteps of subject 16 on treadmill 14. Actuation source support 18 is adjacent to treadmill 14. Optionally, actuation source support 18 can be remote from treadmill 14. Control system 20 is mounted on actuation source support 18. Optionally, control system 20 can be mounted remotely from actuation source support 18.

Actuation source 22 is mounted on actuation source support 18. Actuation delivery mechanism 24 is fitted to subject 16 and is capable of delivering force to a prosthesis (not shown) or physiological joint 26 of subject 16, thereby providing one degree of freedom. Cable 28 links actuation source 22 to actuation delivery mechanism 24, whereby force can be transmitted between actuation source 22 and actuation delivery mechanism 24. Cable 28 can be a rope, line or metal cable, or any other suitable linkage for transfer of force. Sensing system 30 at subject 16 detects a physiological feature of subject 16. Examples of suitable sensors systems include force sensors, pressure sensors, temperature sensors, electromyographic monitors, heart rate monitors, position locators, motion sensors, and any combination thereof. Sensing system 30 is operatively connected to control system 20 by, for example, a wired or wireless connection. Control system 20 at stand 12 links the sensing system to actuation source 22, whereby control system 20 modulates actuation source 22 and thereby modulates prosthesis or physiological joint 26 in response to the physiological feature of subject 16 sensed by sensing system 30.

Alternatively, or in addition to causing actuation of each respective actuation delivery mechanism, actuation source 22 can measure the amount of force applied to its respective actuation delivery mechanism 24 by subject 16 while walking or running on treadmill 14. In addition, actuation source 22 can provide drag on motion of each respective actuation delivery mechanism 24 imposed by subject 16 while walking or running By at least one of: i) causing actuation of actuation delivery mechanism 24; ii) sensing forces applied to actuation delivery mechanism 24 by subject 16; and iii) providing resistance to actuation of actuation delivery mechanism 24 applied by subject 16 while walking or running, actuation source 22 of each respective actuation delivery mechanism 24 can, in combination with control system 20 to which the actuation source 22 is connected, modulate rotation of prosthesis or physiological joint 26 to which actuation delivery mechanism 24 is fitted while subject is walking or running on treadmill 14.

Figure 2:
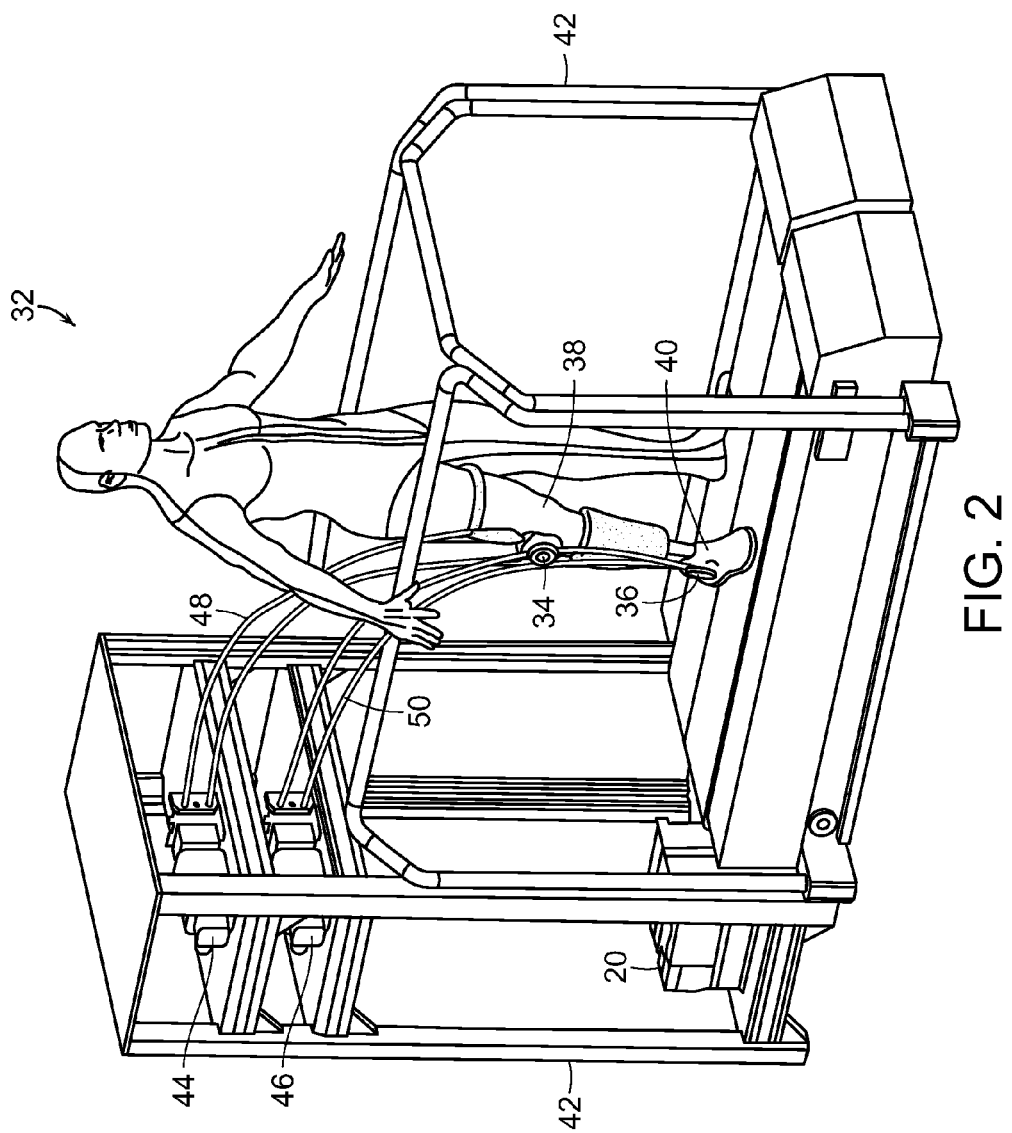
FIG. 2 is a perspective representation of another embodiment of a robotic system for simulating a wearable device of the invention, having two degrees of freedom.

In another embodiment, shown in FIG. 2, robotic system 32 of the invention includes actuation delivery mechanisms 34,36 fitted to knee 38 and ankle 40 of subject 16 by support or stand 42 on which actuation delivery mechanisms 34,36 are mounted, thereby resulting in two degrees of freedom. Each of actuation delivery mechanisms 34,36 is linked to a respective actuation source 44,46 by a pair of cables 48,50. Actuation of either actuation source 44,46 will cause actuation of its respective actuation delivery mechanism 34,36, thereby causing each respective joint 38,40 to which the actuation delivery mechanism 34,36 is fitted, to rotate.

Where more than one actuation source and respective actuation delivery mechanism is employed, control system 20 can coordinate functions of actuation sources to thereby simulate the actuation delivery mechanisms of an ambulatory exoskeleton, orthosis or prosthesis simulating a natural gait of a subject. Pressure sensors or force sensors in the treadmill (not shown) and other sensors, such as temperature sensors, motion sensors, positioning locators, heart rate sensors and muscle electromyography sensors can be linked to control system 20 to provide additional feedback to support replication of a natural gait by contributing to control of actuation sources during simulation of a natural gait by the subject.

As can be seen in FIG. 3, actuation source 52 is linked to actuation delivery mechanism 54 by internal cables 56 and conduits 60. Rotation of driving drum 58 of actuation source 52 causes internal cables 56 to move within cable conduits 60. Movement of internal cables 56 transmits force from actuation source 52 to actuation delivery mechanism 54.

Figure 4B:
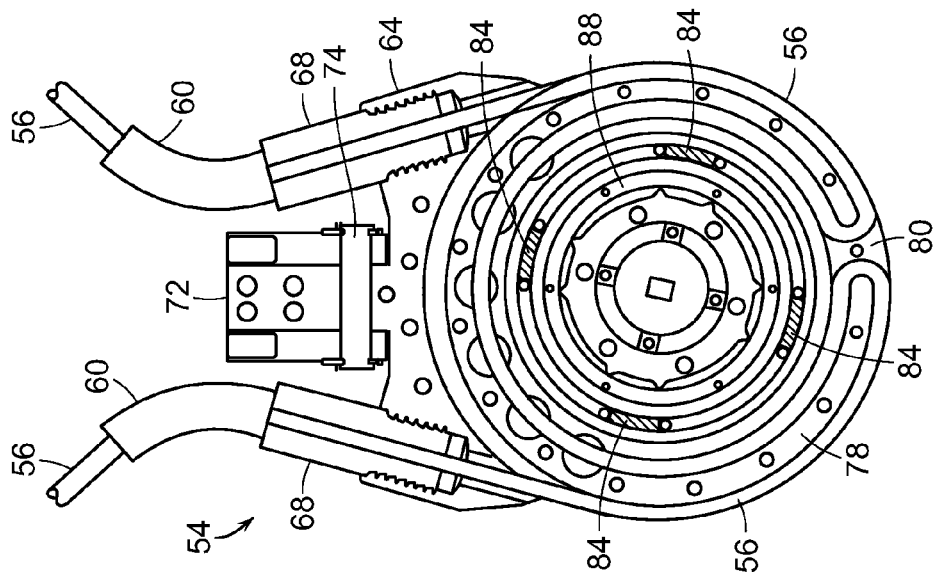
FIG. 4B is a representation of a cross-section of the actuation delivery mechanism of the invention of FIG. 4A.
Figure 4A:
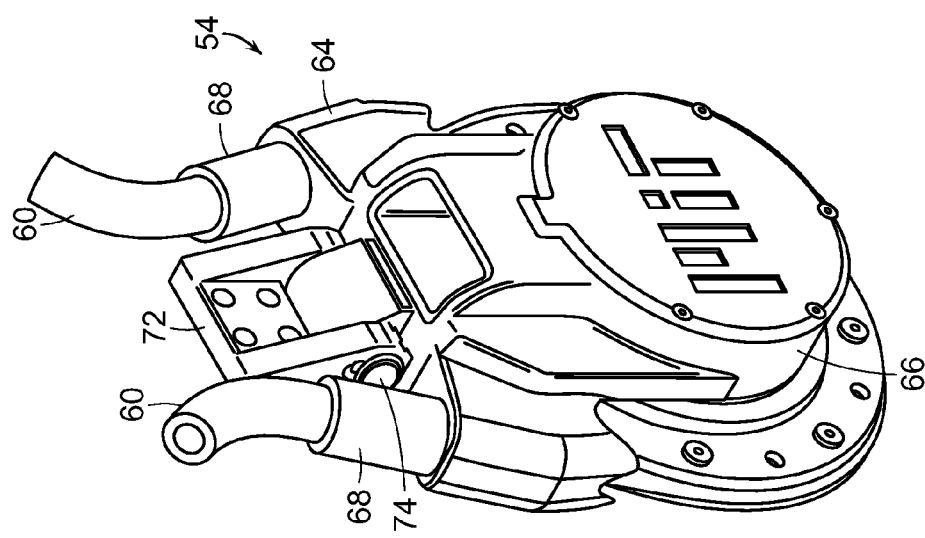
FIG. 4A is a perspective representation of an actuation delivery mechanism of the invention.
Figure 4C:
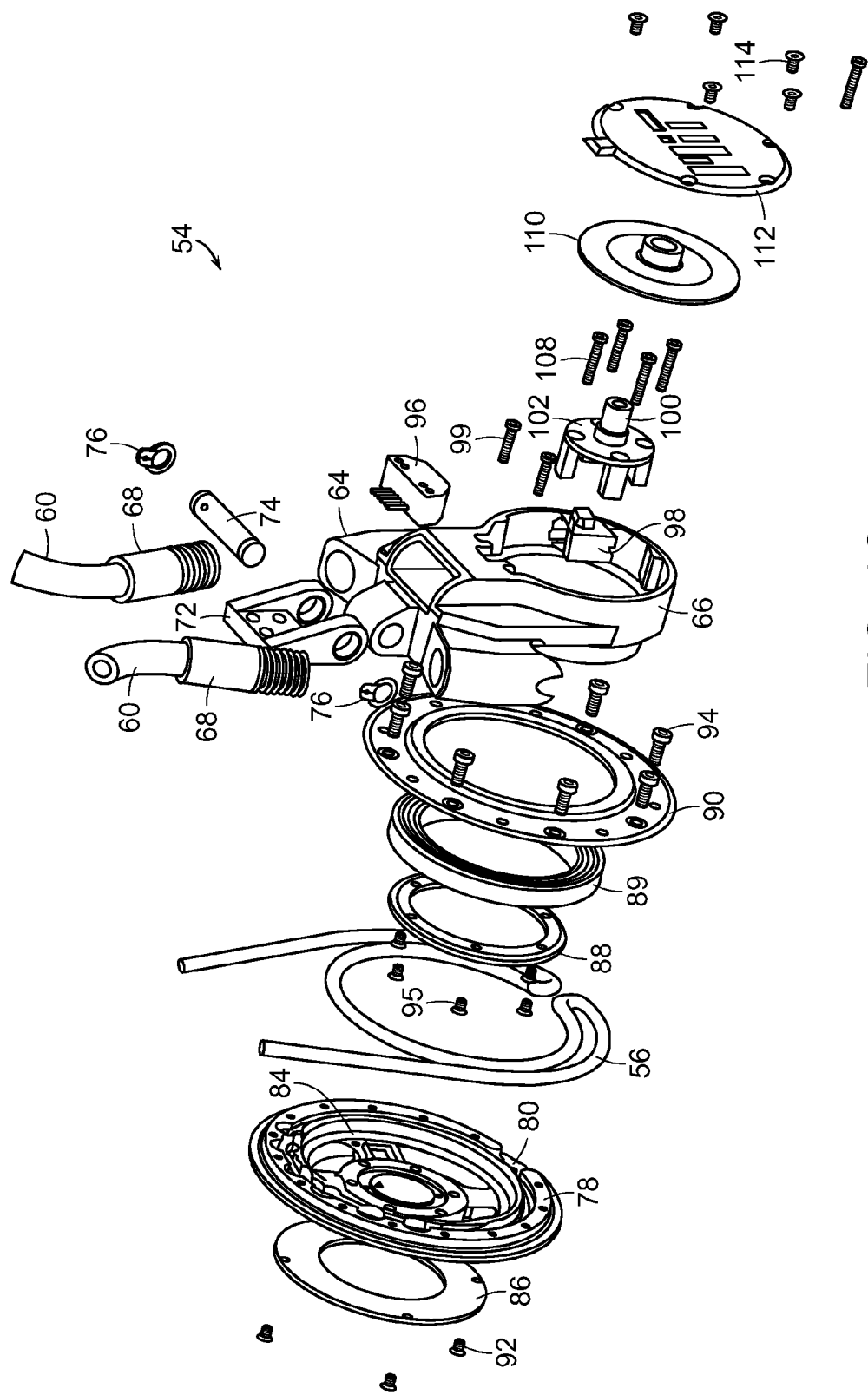
FIG. 4C is an exploded view of the actuation delivery mechanism of FIG. 4A.

FIG. 4A shows a perspective view of one embodiment of an actuation delivery mechanism that can be employed by the invention. Cable conduits 60 are linked at cable conduit anchor 64 by cable conduit boots 68. Actuation delivery mechanism 54 is fixed to an exoskeleton, orthosis or prosthesis (not shown) of a subject by proximal mount 72, which is linked to cable conduit anchor 64 and drum housing 66 by hinge pivot 74, and held in place by retaining rings 76 (FIG. 4C). Rotation of conduit anchor 64 and proximal mount 72 about hinge pivots 74 allows fitting of actuation delivery mechanism 54 at an exoskeleton, orthosis or prosthesis, whereby an axis of rotation of driven drum 78 (FIG. 4B) at conduit anchor 64 and drum housing 66 is essentially collinear with an axis of rotation of the exoskeleton, orthosis or prosthesis fitted to the subject.

Driven drum 78 includes recessed portion 80 into which internal cable 56 is fitted, as shown in FIGS. 4B and 4C. Strain gauges 84 are fitted within driven drum 78. Strain gauges 84 are employed to measure the force applied to driven drum 78 and by internal cable 56 or by exoskeleton, orthosis or prosthesis to actuation delivery mechanism. Internal cable 56 is secured within recessed portion 80 of driven drum 78 and strain gauge 84 by assembly of torque sensor cap 86, bearing cap 88, four-point contact bearing 89 and driven drum clamp plate 90, all of which are secured to conduit anchor 64 and drum housing 66 by screws 92,94,95 as shown in the exploded view of actuation delivery mechanism 54 of FIG. 4C. Encoder detector 96, which is employed to read an optical pattern generated by optical encoder hub disk 110, is mounted on conduit anchor 64 and drum housing 66. Signal amplifier 98 is mounted on encoder shaft 100 and amplifier mount 102 which, in turn, is mounted on driven drum 78 by screws 108. Signal amplifier 98 amplifies the signal of the force on the strain gauge 84 received from strain gauge 84 and transmits that signal back to control system 20 (FIG. 1). Encoder detector 96 generates a signal of the angular position by reading optical patterns of the optical encoder hub disk 110 and transmits that signal back to control system 20 (FIG. 1). Detector fixed pins 99 are employed to constrain the position of encoder detector 96 relative to drum housing 66. Referring back to FIGS. 4A-4C, optical encoder hub disk 110 is mounted on encoder shaft 100 and amplifier mount 102, and sealed within conduit anchor 64 and drum housing 66 by lateral encoder cap 112 and by screws 114. Signal amplifier 98 is employed to convert and amplify the signal generated by strain gauge 84 to a larger voltage output. Optical encoder hub disk 110 can be employed to measure the joint angle as the feedback information for both real-time control and subsequent analyses.

Figure 4D:
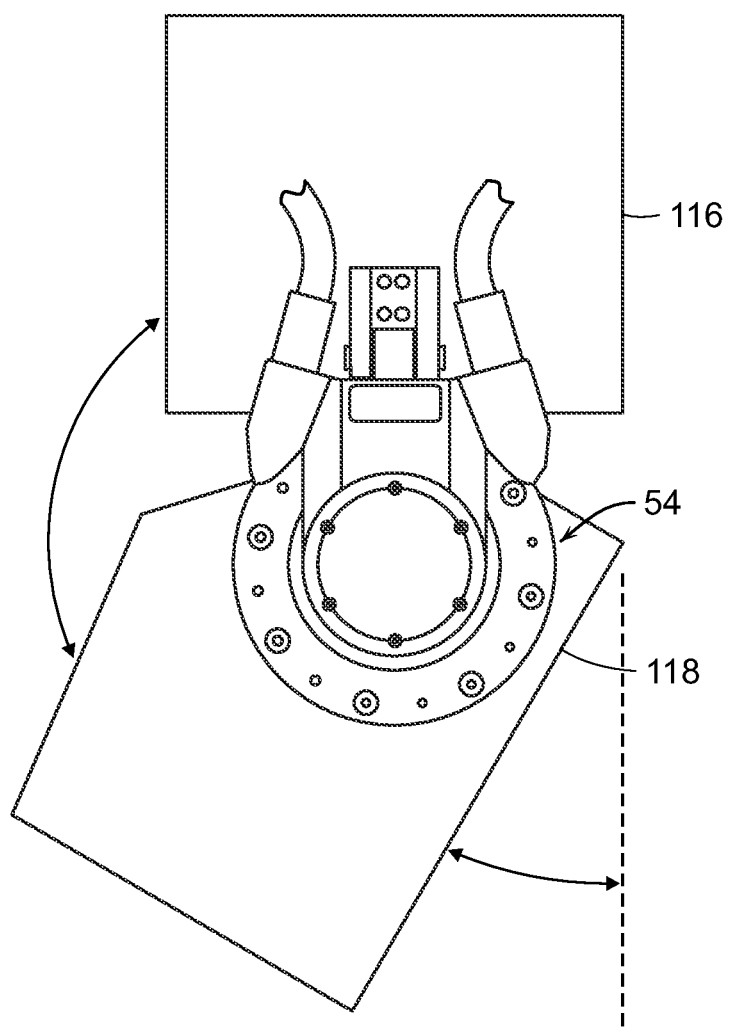
FIG. 4D is a side view of an orthosis that rotates about a joint, and which includes an actuation delivery mechanism.

As shown in FIG. 4D, actuation delivery mechanism 54, when mounted to an exoskeleton, orthosis or prosthesis of a subject, causes linked first 116 and second 118 parts of the exoskeleton, orthosis or prosthesis to rotate relative to each other about an axis of rotation collinear with the axis of rotation of driven drum (not shown). Actuation delivery mechanism 54 thereby responds to delivery of force from the actuation source by rotating a joint of the subject to which an exoskeleton is fitted, to which an orthosis is fitted, or alternatively, by rotating the joint of a prosthesis fitted to the subject. The axis of rotation of actuation delivery mechanism is collinear with that of the joint of the subject.

Figure 5A:
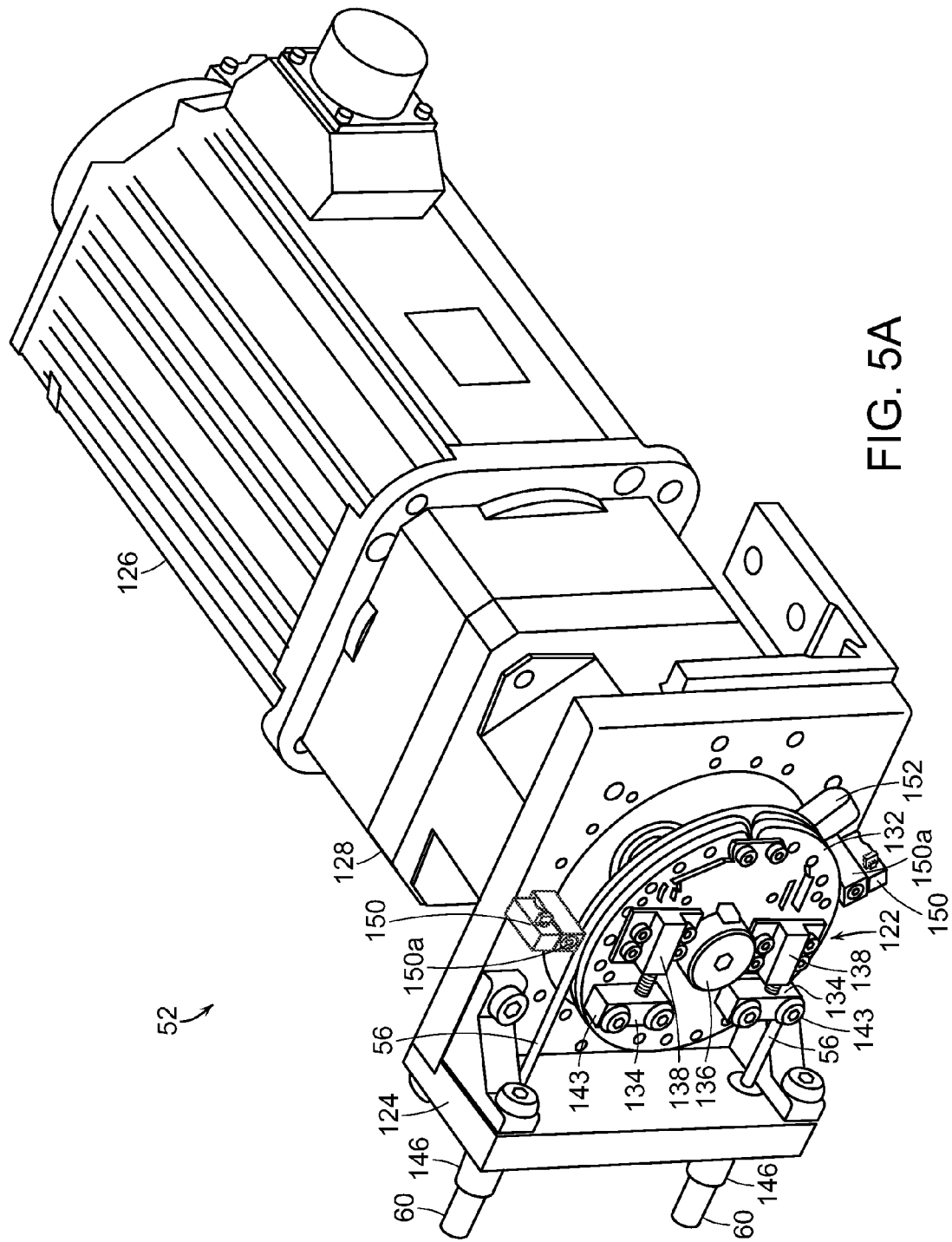
FIG. 5A is a perspective representation of an actuation source of the invention.
Figure 5B:
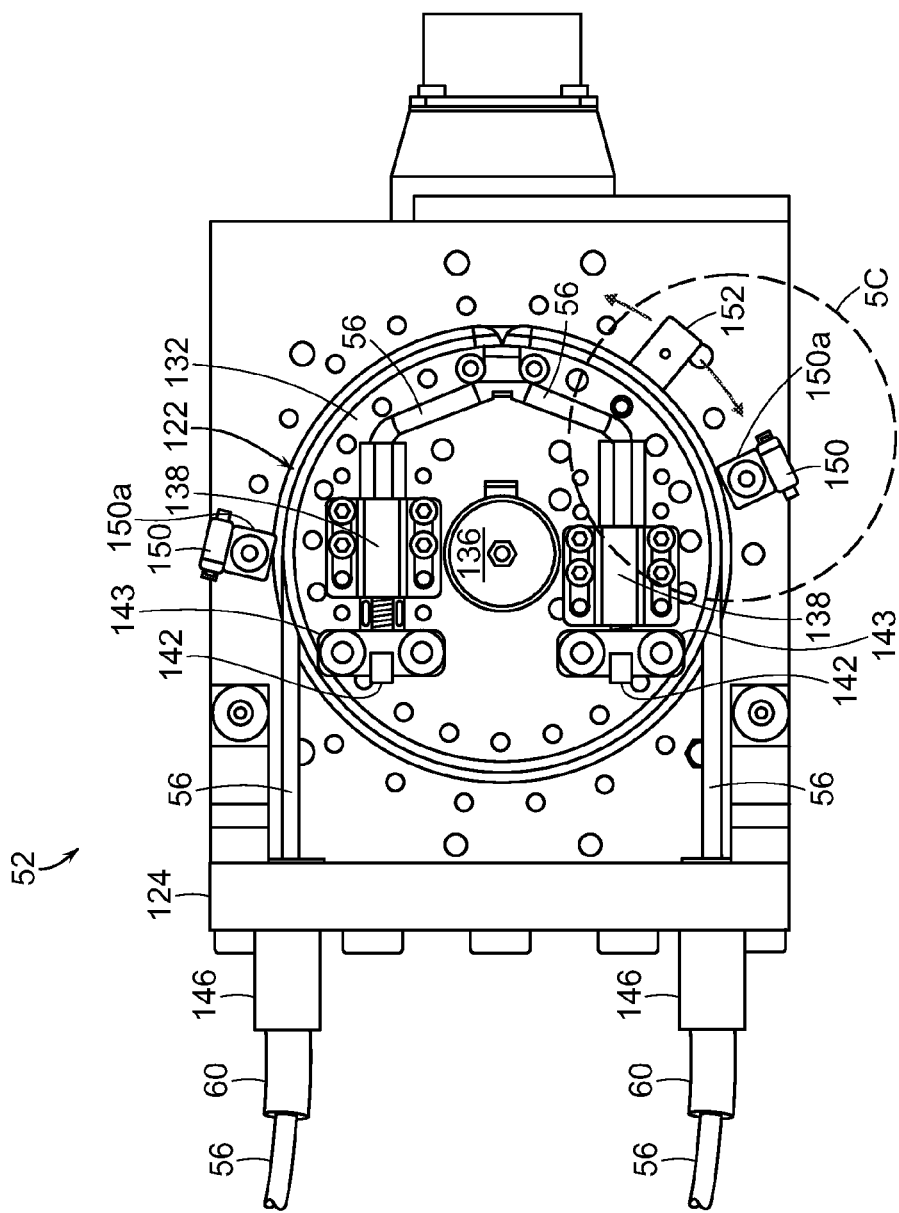
FIG. 5B is an end view of the actuation source shown in FIG. 5A.
Figure 5D:
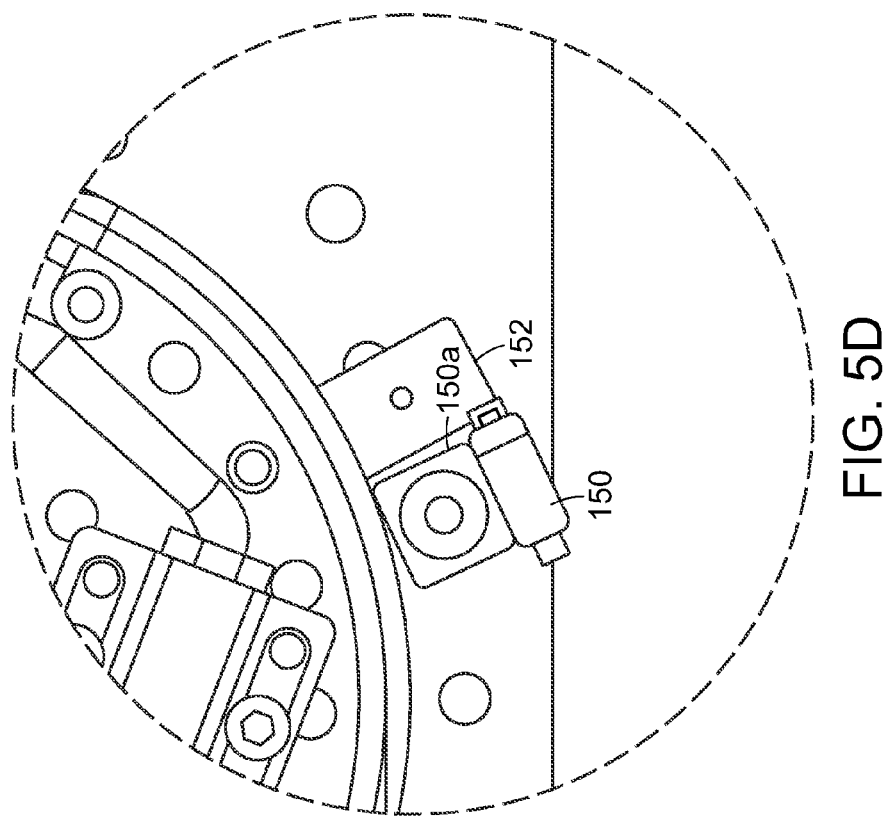
FIG. 5D is a detail of the circled portion of FIG. 5B showing a moving hard stop triggering a limit switch.
Figure 5C:
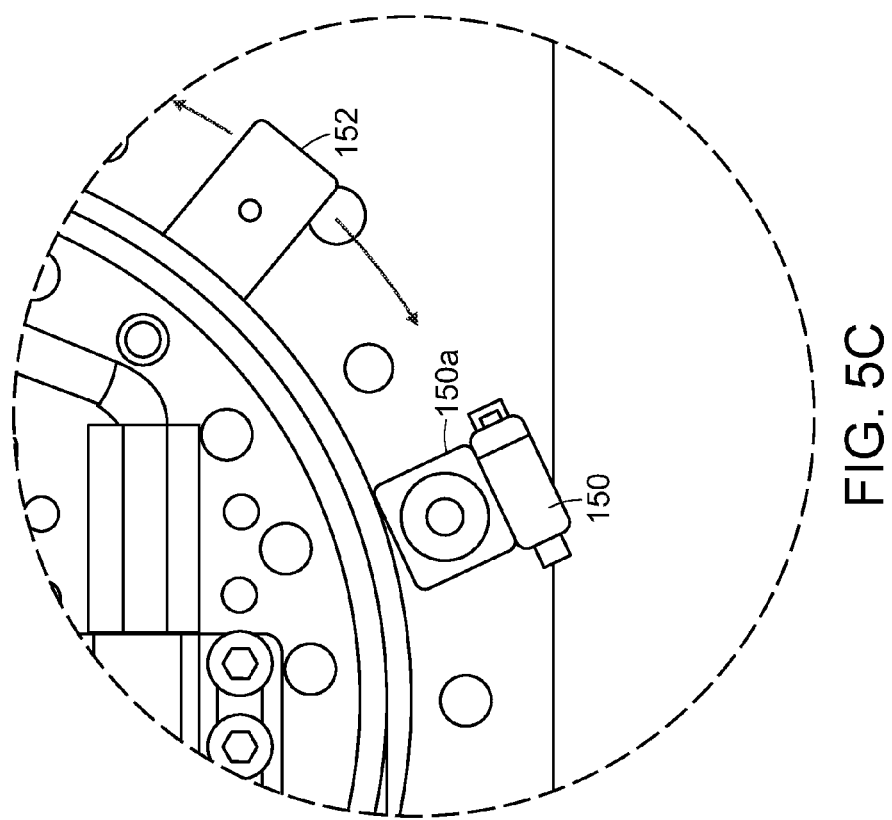
FIG. 5C is a detail of the circled portion of FIG. 5B showing a moving hard stop without triggering a limit switch.
Figure 5E:
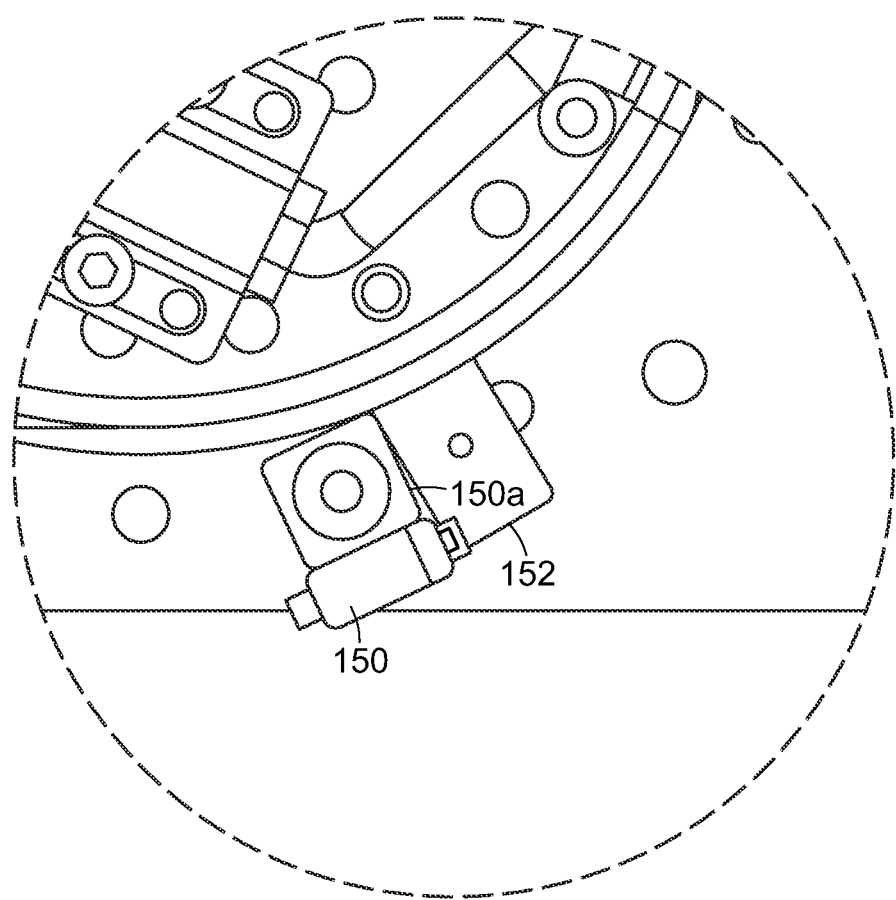
Figure 5F:
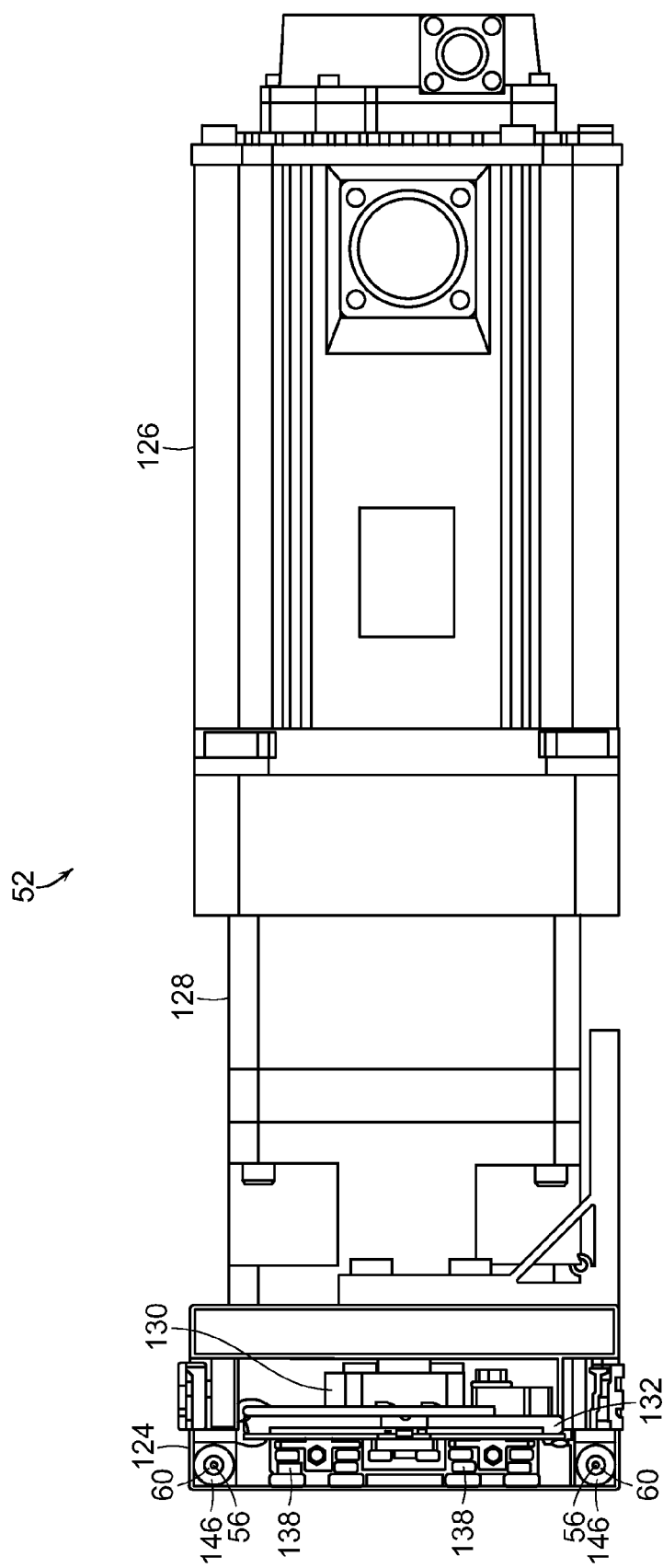
FIG. 5F is a side view of the actuation source shown in FIG. 5A.

As shown in FIGS. 5A through 5E, actuation source 52 includes driving mechanism 122, conduit anchor mount 124 and servomotor 126. Precise gear head 128 of driving mechanism 122 typically has a wide range of reduction ratios, such as a reduction ratio range of about 2:1 to about 100:1, and preferably about 10:1. Precise gear head 128 is to increase output torque of servomotor 126, and provide a highly efficient and near-zero-backlash transmission. Actuation source 52 further includes shaft clamp 130 (FIG. 5F), driving drum 132 and two tension adjusters 134. Shaft clamp 130 is employed to transmit power of gear head output shaft 136 to driving drum 132. Holding the two ends of inner cable 56 are two tension adjusters, namely, tap screws 142, that are configured to adjust tension on inner cable 56, at tap mounts 143. In other words, each end of cable 56 is fixed to individual cable anchor 138, and cable anchors 138 consequently can only be moved linearly relative to driving drum 132 by tightening or loosening tap screws 142 through the guided way on driving drum 132. Ends of conduits 60 include threaded end fittings 146 that are anchored in threaded holes of conduit anchor mount 124. Two limit switches 150 are mounted on two fixed hard stops 150a. Moving hard stop 152 is mounted on driving drum 132. As can be seen in FIG. 5C, moving hard stop 152 can move with rotation of driving drum 132, as indicated by the arrow shown in FIG. 5C. If the physiological joint of the subject to which the actuation delivery mechanism is linked approaches a preset limit, moving hard stop 152 will first trigger corresponding limit switch 150, as shown in FIG. 5D, causing limit switch 150 to send an alert signal to a master controller (not shown). If the physiological joint of the subject rotates further, hard stop 152 will collide with an associated fixed hard stop 150a, thereby preventing rotation of the physiological joint of the subject from exceeding the preset joint limitation, as shown in FIG. 5E. Movement of the physiological joint of the subject beyond a preset limitation in the other direction by the other of the two limit switches 150 and hard stop 150a on the opposite side of the travel path of moving hard stop 152 is prevented in like manner.

Figure 6:
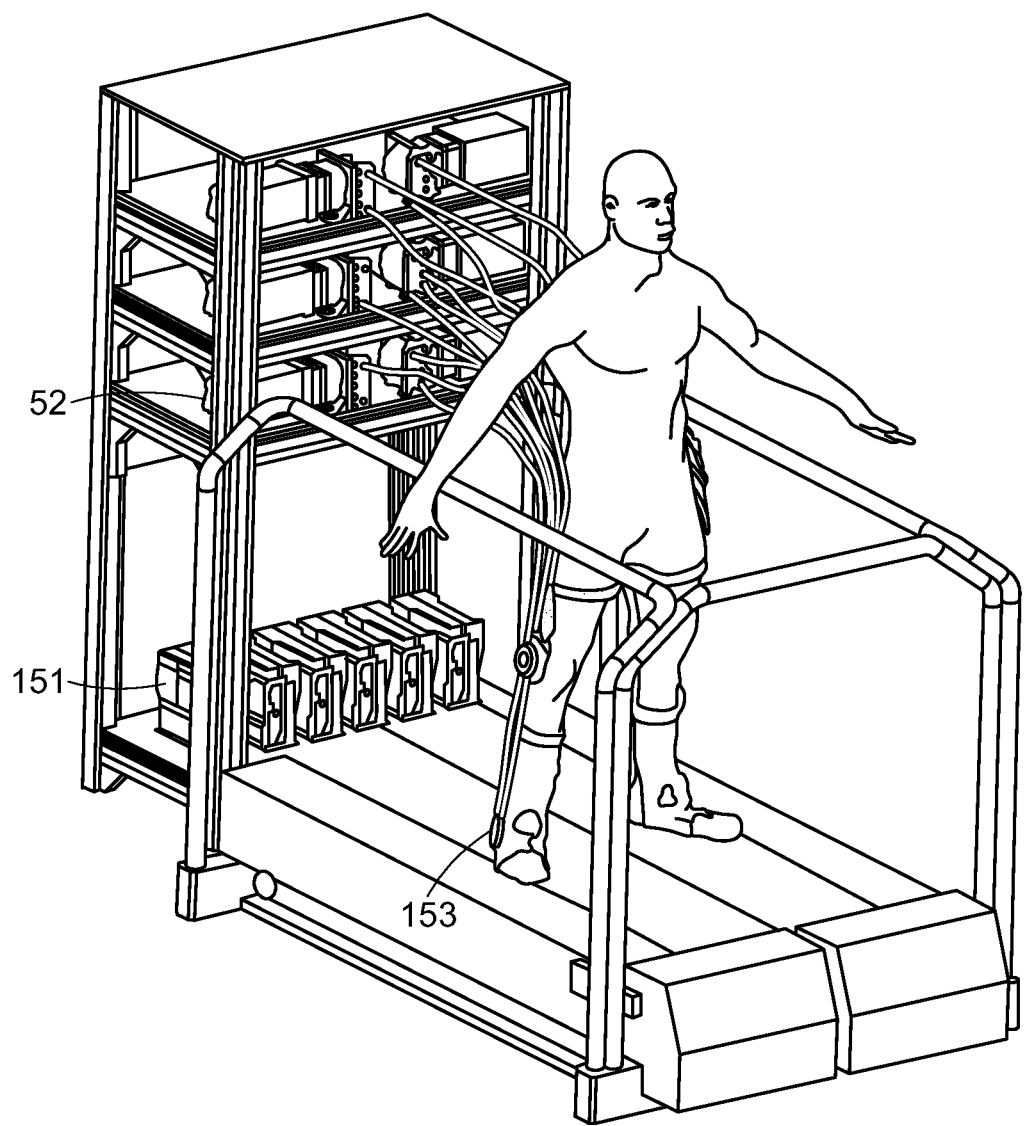
FIG. 6 is a perspective view of another embodiment of the system of the invention showing an embodiment of the invention having six degrees of freedom.
Figure 7:
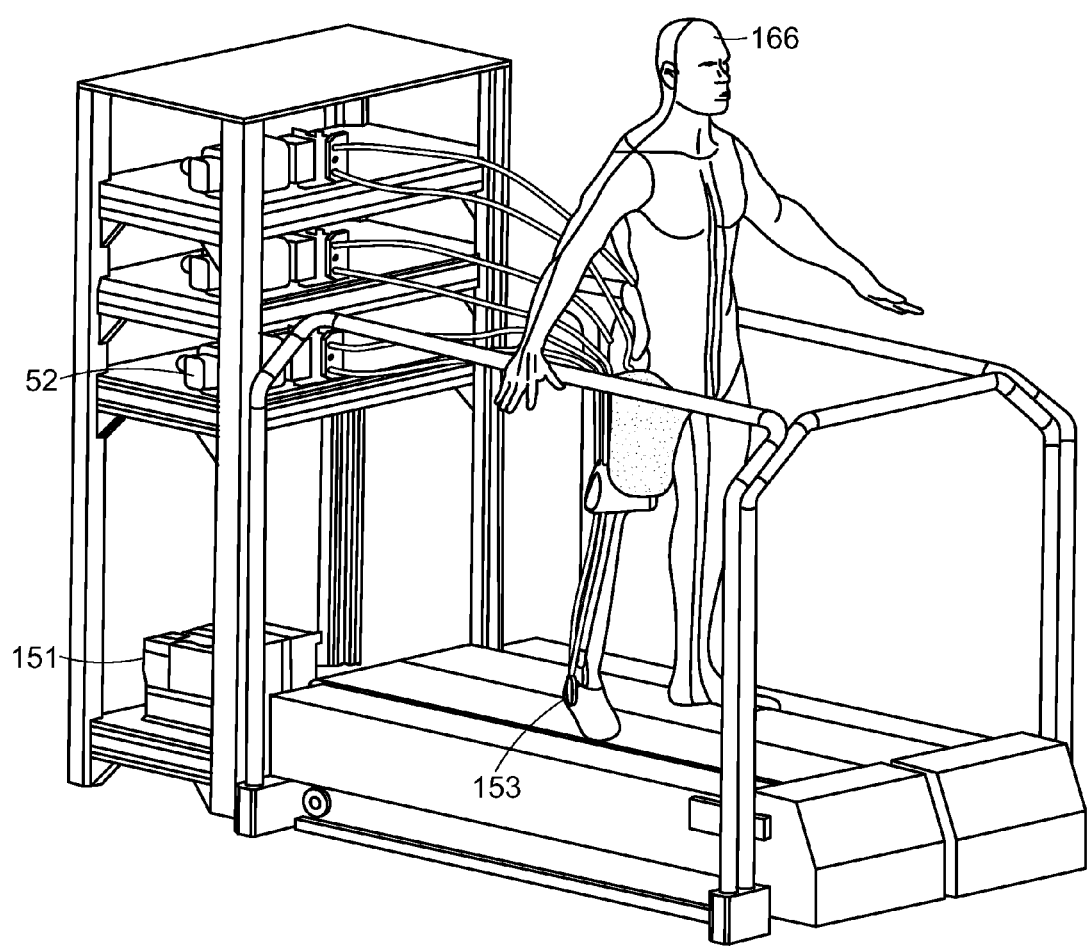
FIG. 7 is a perspective view of another embodiment of the invention, wherein the robotic system provides three degrees of freedom, two of which are provided to prosthetic joints.
Figure 8C:
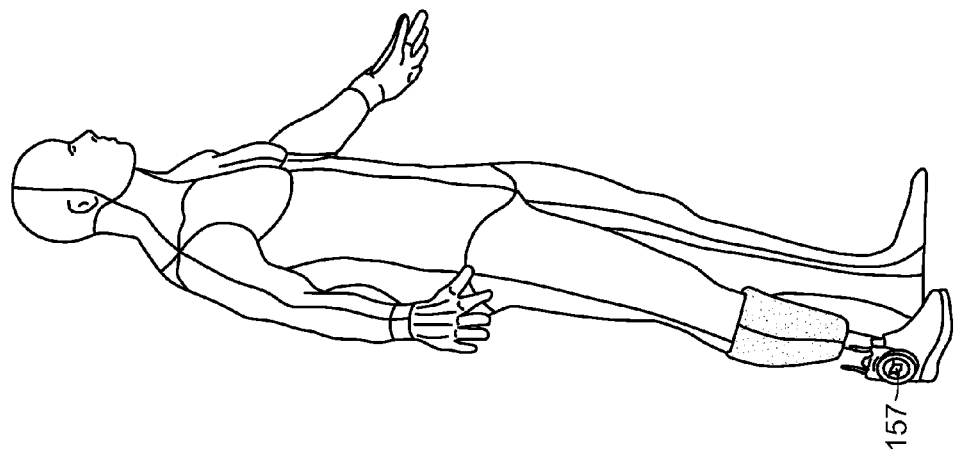
FIG. 8C is a side view of a potential configuration of the actuation delivery mechanism of the invention in combination with a subject having a prosthetic ankle
Figure 8B:
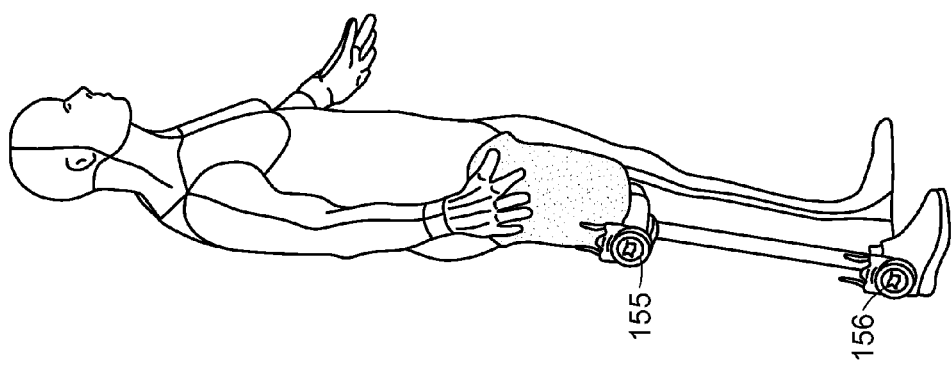
FIG. 8B is a side view of a potential configuration of the actuation delivery mechanism of the invention in combination with a subject having a prosthetic knee and ankle.
Figure 8A:
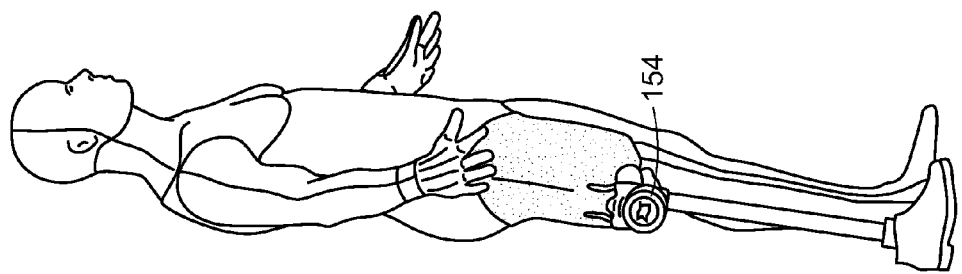
FIG. 8A is a side view of a potential configuration of the actuation delivery mechanism of the invention in combination with a subject having a prosthetic knee.

FIGS. 6 and 7 show representations of embodiments of the invention that, collectively, employ six degrees of freedom on physiological limbs of a subject (FIG. 6), and, collectively, three degrees of freedom on a subject having a prosthetic knee and ankle (FIG. 7). One degree of freedom is provided for each physiological or prosthetic joint of a subject to be assisted or modeled. Each degree of freedom will include local controller and driver 151, actuation source 52 and actuation delivery mechanism 153, of which a single combination is numbered for an ankle of the subject in FIG. 6, but are shown for the other ankle, both knees and hips of subject 166. Similarly, FIG. 7, which represents three degrees of freedom, is numbered only for the one degree of freedom for local controller and driver 151, actuation source 52 and actuation delivery mechanism 153, of the prosthetic ankle of subject 166 therein. FIGS. 8A through 8C are representations of three possible configurations of actuation delivery mechanisms employed by the invention, including prosthetic knee alone 154 (FIG. 8A), a prosthetic knee 155 and ankle 156 (FIG. 8B), and a prosthetic ankle alone 157 (FIG. 8C).

Figure 9:
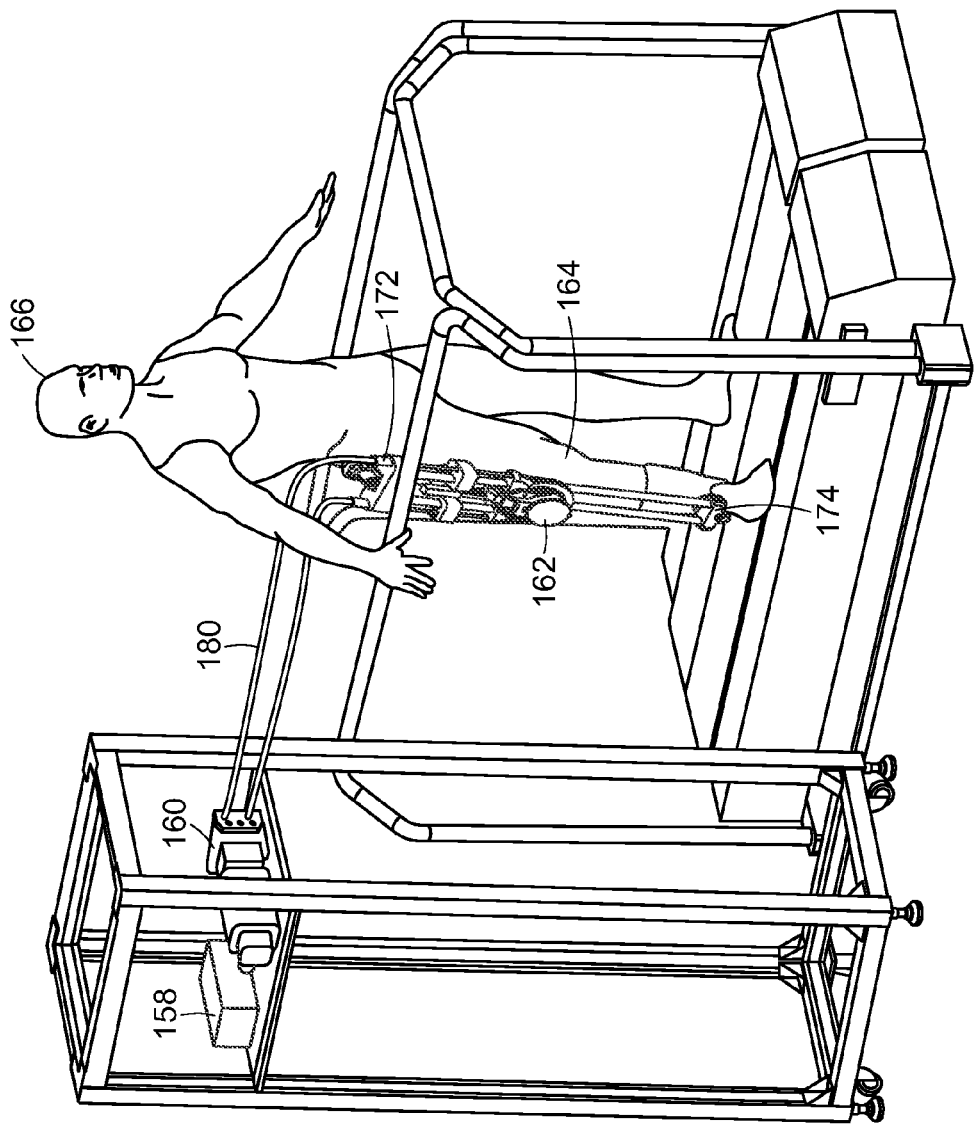
FIG. 9 is a representation of another embodiment of the invention, wherein the actuation delivery mechanism provides linear, rather than rotational force.
Figure 10:
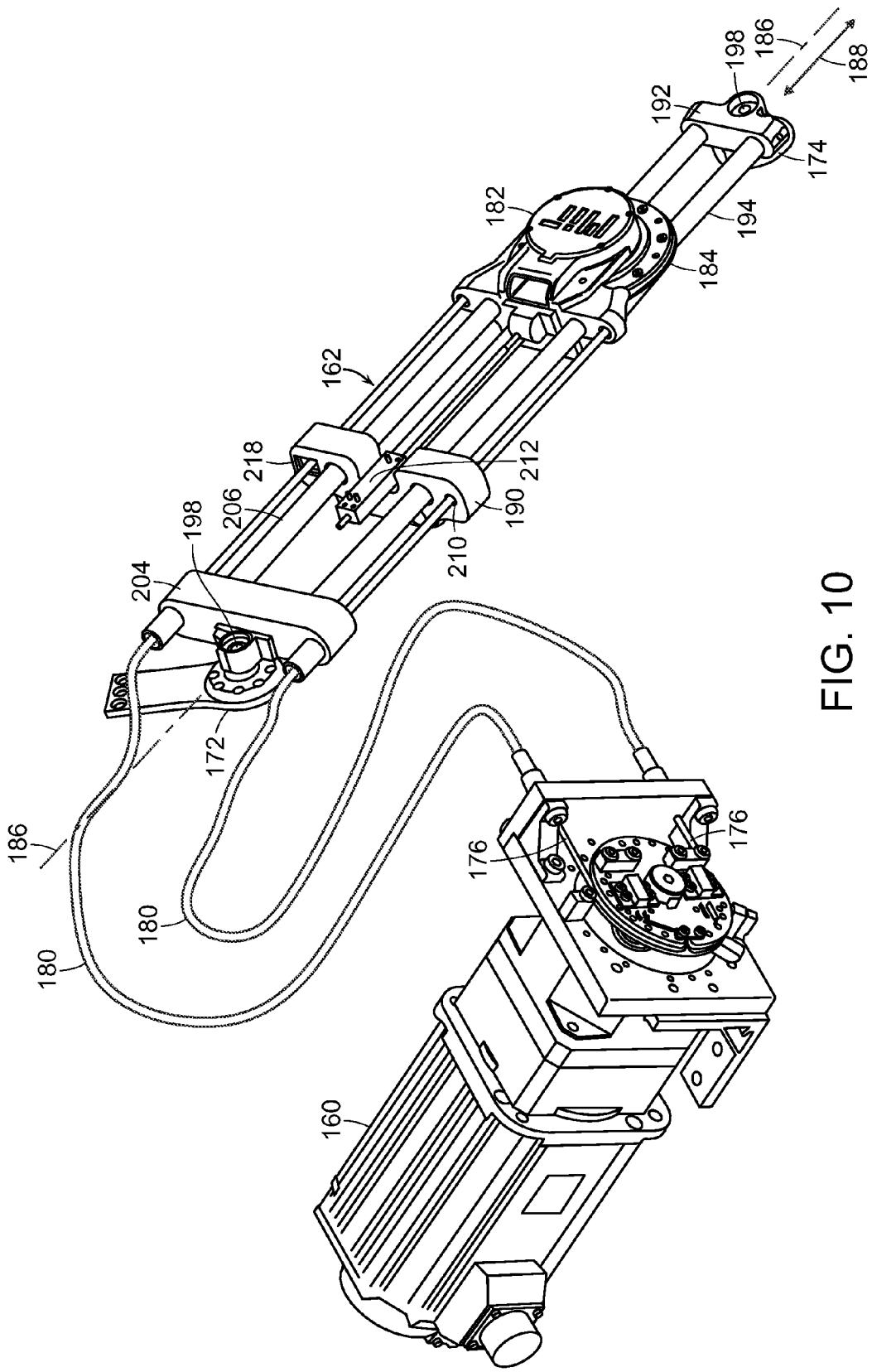
FIG. 10 is a representation of the actuation source, cable and actuation delivery mechanism of the embodiment of the invention shown in FIG. 9.
Figure 11B:
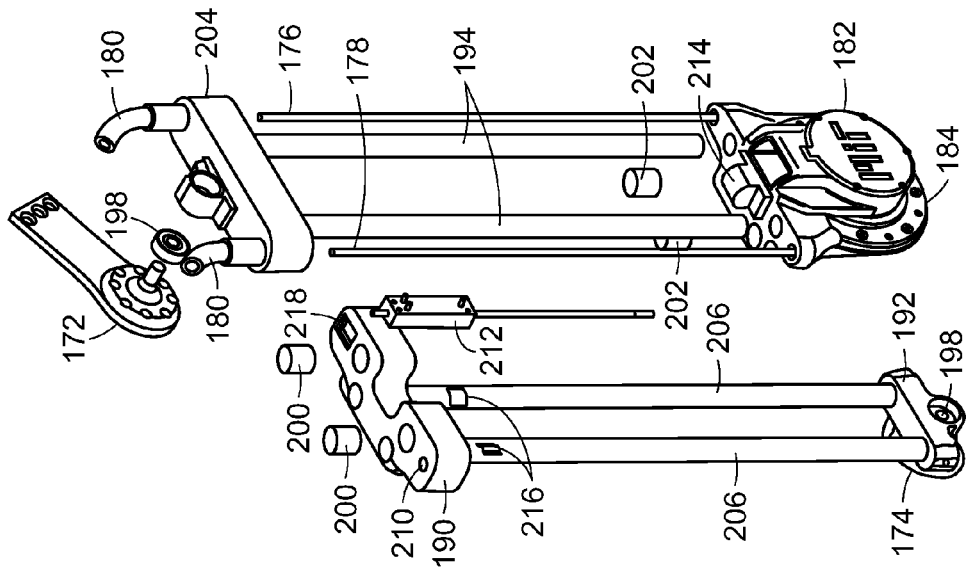
FIG. 11B is an exploded view of the actuation delivery mechanism shown in FIG. 11A.
Figure 11A:
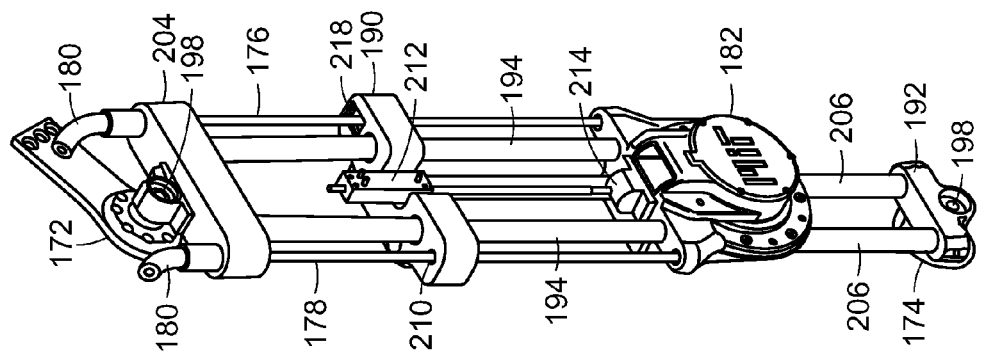
FIG. 11A is a representation of the actuation delivery mechanism shown in FIGS. 9 and 10.

In another embodiment of the invention, shown in FIGS. 9, 10, 11A and 11B, actuation source 160 is linked to controller 158 and to actuation delivery mechanism 162 spanning physiological knee 164 of subject 166. As can be seen in FIG. 10, actuation delivery mechanism 162 includes extreme ends at which proximal distal pivots 172,174 are fixed. Cable 176 extends through cable conduits 180 of actuation delivery mechanism 162 Inner cable 176 inside of two cable conduits 180 can be a single cable that extends from actuation source 160 to actuation delivery mechanism 162 and back to actuation source 160 again. Actuation of actuation source 160 causes movement of a driven drum (not shown) within actuation delivery component 182 and consequent lengthening and shortening of actuation delivery mechanism 162 along major longitudinal axis 186 of actuation delivery mechanism 162 in the directions of arrow 188. FIGS. 11A and 11B show assembled and exploded views, respectively, of actuation delivery mechanism 162. Linear carriage 190 is fixed to output mount 192 by output rods 206. Distal pivot 174 is fixed to output mount 192 by ball joint bearing 198. Linear bushings 200 fit within linear carriage 190.

Proximal pivot 172 is fixed through ball joint bearing 198 to proximal mount/cable anchor 204. Proximal mount 204 is fixed relative to actuation delivery component 182 by output guide rods 194. Inner cable 176 extends through cable conduits 180 and openings of linear carriage 190 to actuation delivery component 182, which has the same mechanical construction and operation as does actuation delivery mechanism 54, except that actuation delivery component 182 is mounted on rods 194 and moves along rods 206, as discussed above, rather than being mounted directly to an exoskeleton, orthosis or prosthesis, as shown in FIG. 4D. Cable 176 is fixed at one fixed point 218 of linear carriage 190 and is free to move through opening 210 in linear carriage 190. When assembled, output guide rods 194 extend through linear bushings 200 at linear carriage 190, while output rods 194 extend through linear bushings 202 fitted at actuation delivery component 182.

The input end of potentiometer/linear digital encoder 212 is fixed to actuation delivery component 182 at encoder fixed mount 214, and the body of potentiometer/linear digital encoder 212 is fixed to linear carriage 190. Strain gauges 216 are mounted on output guide rods 206, thereby measuring the strain on output guide rods 206 caused by the force applied to the device.

As shown in FIG. 9, when fitted to subject 166, proximal pivot mount 172 and distal pivot mount 174 are fitted to subject 166. Physiological or prosthetic joint 164 is located between proximal pivot mount 172 and distal pivot mount 174 when properly fitted to subject 166. Proximal pivot mount 172 and distal pivot mount 174 rotate freely about their respective axes.

Referring to all of FIGS. 9, 10, 11A and 11B, in operation actuation of actuation source 160 by controller 158 causes inner cable 176 (FIG. 11A, 11B)) to move, thereby rotating driven drum 184 within actuation delivery component 182. With rotation of driven drum 184 within actuation delivery component 182, actuation of actuation source 160 by controller 158 to cause inner cable 176 to move in one direction causes fixed point 218 linking inner cable 176 and linear carriage 190 to approach proximal pivot mount 172, thereby causing proximal and distal pivot mounts 172,174 to get closer together and, consequently, causing joint 164, such as physiological knee of subject, shown in FIG. 9, to rotate in one direction, namely, by bending the joint. Actuation of actuation source 160 by controller 158 to cause inner cable 176 to move in the opposite direction will cause linear carriage 190, where cable 176 is fixed at fixed point 218, to approach actuation delivery component 182 along output guide rods 206, thereby increasing the distance between proximal and distal pivots. Increasing the distance between proximal pivot mount 172 and distal pivot mount 174 will cause rotation of, for example, joint or physiological knee 164 of subject 166 in the opposite direction, namely by causing physiological knee 164 of subject 166 to straighten.

Control Hardware

Figure 12:
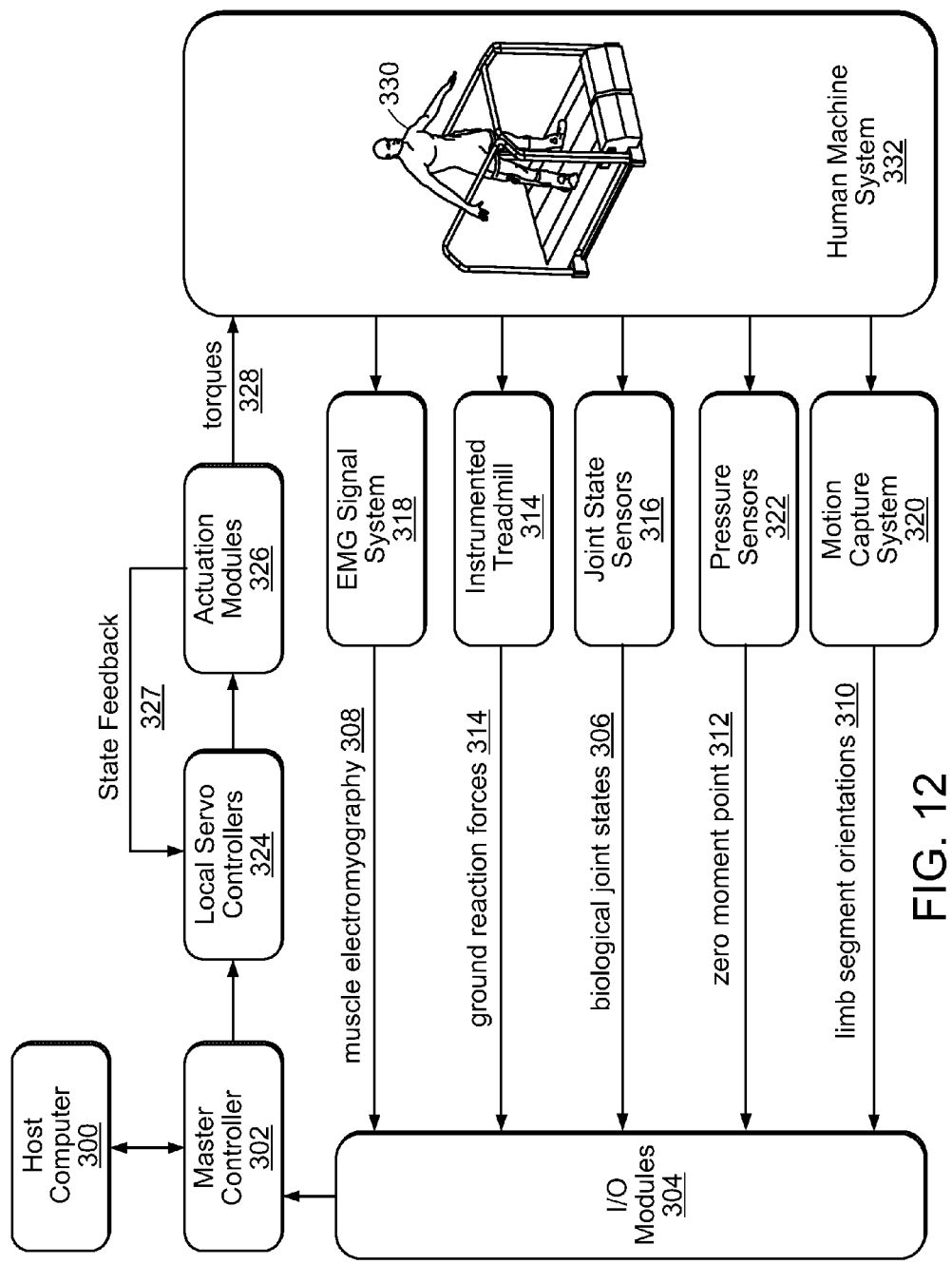
FIG. 12 is a schematic representation of one embodiment of a control system and its linkage to a subject that is the subject of modulation by the method of the invention.
Figure 13:
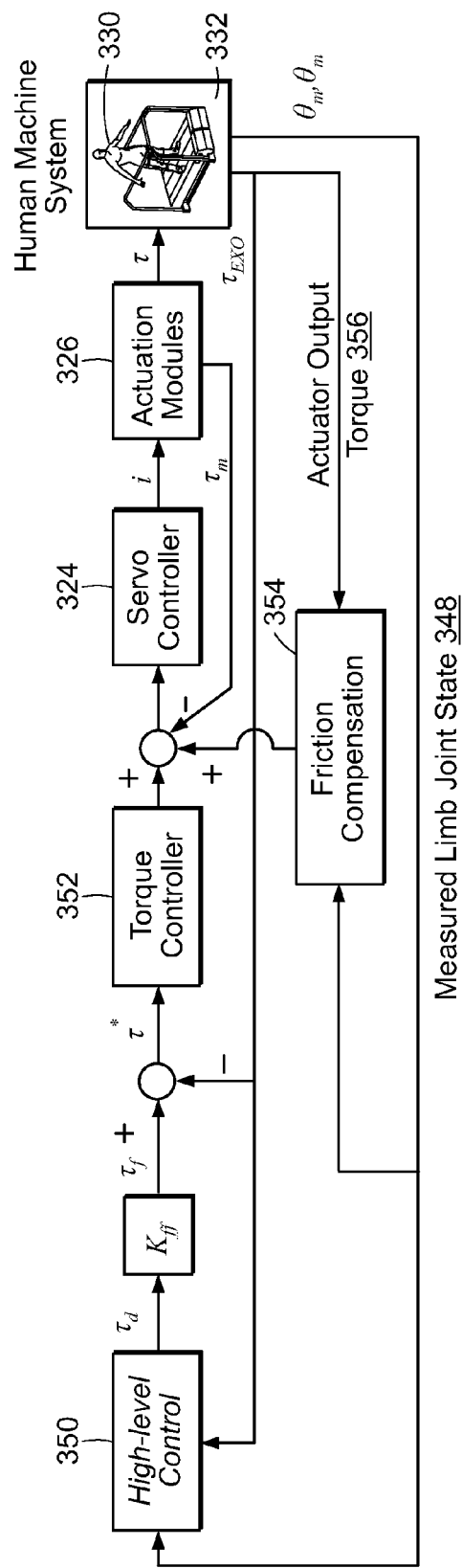
FIG. 13 is a schematic representation of one possible control system configuration under the general system architecture represented in FIG. 12.

As shown in FIGS. 12 and 13, in order to ensure real-time control and system safety, high level control algorithms, e.g. virtual model control, impedance control, are implemented with a host computer 300 and a master controller 302, such as an EtherCAT® master controller which is fitted with a 1 kHz processor, whereas the low level motor control, e.g. torque control, position control, is implemented in local servo controllers 158 (FIG. 9). The EtherCAT® network is an open high performance Ethernet-based fieldbus system, providing short data update times with low communication jitter. An EtherCAT® slave I/O system will be connected to the master controller 302. It has multiple digital inputs and multiple digital outputs, which will be used for gathering encoder feedback signals, torque feedback signals, etc. In general, the I/O module 304 can receive biological joint states 306, muscle electromyography 308, limb segment orientations 310, the zero moment point 312, and ground reaction forces 314 measured from the biological legs using joint sensors 316, a EMG signal system 318, a motion capture system 320, pressure sensors 322, and instrumented treadmill 314, respectively. Using these sensory data, master controller 302 will command ankle, knee and hip joint torque commands applied to the biological joints of subject 330 and human machine system 332 from the Tethered Wearable Robot System of the invention ("T-EXO"), to the local servo controllers 324 and actuation modules 326, and through state feedback 327, then enforcing the desired actuator torque 328 using the measured output torque.

For instance, to test different hypotheses, the Tethered Wearable Robot System of the invention ("T-EXO") allows users to implement specific high level control algorithms to generate an equivalent torque profile according to associated mathematic models. The measured limb joint state 348 will be used to produce a torque command using high-level control 350. This desired joint torque will be fed through a torque control system to obtain a current command to the electric motors. The torque control system contains the feed forward gain, torque controller 352, and friction compensation term 354. High-Level control 350 creates desired torque commands, and the friction compensation term produces an additional torque value to compensate lost energy due to friction. The closed-loop torque controller then enforces the desired actuator torque using the measured actuator output torque 356. Thereby, the T-EXO will be capable of applying controlled torques to any or all lower-extremity joints in the plane of walking or running while a study participant walks/runs on a force instrumented treadmill, allowing users to investigate the effect of the different kinds of joint torque interventions.

Advantage and Improvements Over Prior Art

Conventional devices for lower extremity augmentation, rehabilitation and assistance have either limited degrees of freedom or limited output capacity, and thus can only be used for rehabilitation or assisting human walking at low speed. Further, most of the multiple degrees-of freedom tethered devices have rigid linkage transmission designs, that not only restrict body movements but also have significant added inertia attached to the wearer's body. Among other things, conventional devices do not have multiple degrees-of-freedom for applying controlled torques to ankle, knee, and hip joints for understanding human locomotion at high running speed. In exemplary implementations of this invention:

With flexible, powerful, real-time control hardware, versatile feedback signals and powerful tethered actuation modules, the T-EXO can apply controlled torques to different limb joints and/or prosthetic joints according to sophisticated algorithms while recording the motions, forces, muscle electromyography/mechanics, and human gait metabolic rate from the resulting gait. Such a device may allow researchers and engineers to both test hypotheses regarding effective designs for exoskeletons, orthoses and prostheses, and to devise different kinds of augmentation, rehabilitation or assistive strategies. With the powerful tethered actuation module design, the T-EXO is able to produce large torques for each limb and/or prosthetic joint at maximum human sprinting speed without adding the leg mass or inertia that would typically be present while using such large actuators. This system is ideal for simulating the effect of all kinds of augmentation, rehabilitation and assistive devices. With tethered actuation module design and minimum body attachments, the T-EXO can be easily maintained and expanded to include additional modules for more actuated degrees-of-freedom. Thus, it should be understood to those skilled in the art that additional lower-extremity joint modules could be added to the T-EXO system, as well as torso and upper body modules, from what has been specifically depicted in the FIGS. and text of this patent specification.

Equivalents

While this invention has been particularly shown and described with references to example embodiments thereof, it will be understood by those skilled in the art that various changes in form and details may be made therein without departing from the scope of the invention encompassed by the appended claims.

CITATIONS

REFERENCES

[1] S. Karlin, "*Raiding Iron Man's closet,*" *IEEE Spectrum*, vol.48, issue 8, pp. 25, 2011.

[2] A. Zelinsky, "*Robot suit hybrid assistive limb,*" *IEEE Robotics & Automation Magazine*, vol. 16, issue 4, pp. 98-102, 2009.

[3] R. Bogue, "*Exoskeletons and robotic prosthetics: a review of recent developments,*" *Industrial Robot: An International Journal*, vol. 36, issue 5, pp. 421-427, 2009.

[4] H. Kazerooni, et al., *On the control of the Berkeley Lower Extremity Exoskeleton (BLEEX),*" in *Proceedings of IEEE International Conference on Robotics and Automation*, pp. 4353-4360, 2005.

[5] A. M Grabowski and H. M. Herr, "*Leg exoskeleton reduces the metabolic cost of human hopping,*" *Journal of Applied Physiology*, vol. 107, pp. 670-678, 2009.

[6] C. J. Walsh, et al., "*A quasi-passive leg exoskeleton for load-carrying augmentation,*" *International Journal of Humanoid Robotics*, vol. 4, pp. 487-506, 2007.

[7] M. S. Cherry, et al., "*An elastic exoskeleton for assisting human running,*" in *Proceedings of ASME International Design Engineering Technical Conferences & Computers and Information in Engineering Conference*, pp. 727-738, 2009.

The relevant teachings of all references cited are incorporated herein by reference in their entirety.

What is claimed is:

1. A robotic system for simulating a wearable device, comprising:
 a) an actuation delivery mechanism suitable for fitting to a subject and capable of delivering force to a prosthetic or a physiological joint of the subject,
  wherein the actuation delivery mechanism includes,
  i) first and second parts that are linked telescopically, whereby actuation of the actuation delivery mechanism causes relative movement along major longitudinal axes of the first and second parts, said major longitudinal axes being substantially parallel with each other, at least one of the first and second parts including a pivot mount at one extreme end of the actuation delivery mechanism, whereby mounting the actuation delivery mechanism to a subject at the pivot mount and at the other extreme end of the actuation delivery mechanism, causes the joint of the subject between the extreme ends of the actuation delivery mechanism to rotate upon actuation of the actuation delivery mechanism, and
  ii) a rotary drum mounted to the first part;
 b) an actuation source remote from the actuation delivery mechanism wherein the actuation source is configured to deliver force to the actuation delivery mechanism;
 c) at least one cable linking the actuation source to the actuation delivery mechanism, wherein the cable is linked to the rotary drum, and by a linkage of the cable to the second part, whereby actuation of the actuation delivery mechanism causes the drum to rotate, thereby changing the distance between the drum and linkage of the cable to the second part to thereby move the first part relative to the second part along substantially parallel major longitudinal axes of the first and second parts whereby force can be transmitted between the actuation source and the actuation delivery mechanism;
 d) a sensing system that detects a physiological feature of the subject; and
 e) a control system linked to the sensing system and the actuation source, whereby the control system modulates the actuation source and thereby modulates actuation of the prosthetic or physiological joint in response to the physiological feature sensed by the sensing system.

2. The robotic system of claim 1, wherein the actuation delivery mechanism includes a sensor selected from the group consisting of a torque sensor, an angle sensor and a position sensor.

3. The robotic system of claim 2, wherein the actuation delivery mechanism further includes at least one strain gauge, whereby force exerted in the plane of rotation of the joint of the subject can be measured.

4. The robotic system of claim 3, wherein the joint of the subject is selected from the group consisting of an ankle joint, a knee joint and a hip joint.

5. The robotic system of claim 1, wherein the system includes at least two actuation delivery mechanisms and at least two actuation sources, wherein each actuation delivery mechanism is linked to one of the actuation sources, and wherein the control system modulates the actuation of each actuation delivery mechanism by each corresponding actuation source relative to the actuation of the other actuation delivery mechanism.

6. The robotic system of claim 1, wherein the actuation source is mounted on a support independent of the subject.

7. The robotic system of claim 1, wherein the sensing system includes at least one member selected from the group consisting of at least one pressure sensor, temperature sensor, motion sensor, positioning locator, heart rate sensor, and muscle electromyography sensor and a camera.

8. The robotic system of claim 1, further including a stand on which the actuation source is mounted, the stand including a treadmill on which the subject can walk in place.

9. The robotic system of claim 8, wherein the treadmill includes pressure sensors for detecting the footsteps of the subject on the treadmill.

10. The robotic system of claim 9, wherein the pressure sensors detect at least one of force, pace and gait of footsteps of the subject.

11. The robotic system of claim 3, wherein the actuation delivery mechanism is configured to rotate a joint of the subject selected from the group consisting of a shoulder joint, an elbow joint, a wrist joint, a finger joint and a shoulder joint.

12. The robotic system of claim 1, further including an exoskeletal component that structurally supports and links at least two actuation delivery mechanisms of the device.

13. The robotic system of claim 1, wherein the actuation delivery mechanism includes two pivot mounts, wherein each extreme end of the actuation delivery mechanism includes a pivot mount.

14. The robotic system of claim 13, wherein the pivot mounts have axes of rotation that are substantially parallel.

15. The robotic system of claim 13, wherein the pivot mounts have axes of rotation that are transverse.

16. The robotic system of claim 1, wherein the actuation delivery mechanism includes a position sensor to indicate the relative positions of the first and second parts.

17. A method for simulating a wearable robotic device, comprising the steps of:
  a) fitting an actuation delivery mechanism to a subject, the actuation delivery mechanism being capable of delivering force to a prosthetic or a physiological joint of the subject, and linked by at least one cable to an actuation source remote from the actuation delivery mechanism, whereby force is transmitted between the actuation source and the actuation delivery mechanism wherein the actuation delivery mechanism includes,
    i) first and second parts that are linked telescopically, whereby actuation of the actuation delivery mechanism causes relative movement along major longitudinal axes of the first and second parts, said major longitudinal axes being substantially parallel with each other, at least one of the first and second parts including a pivot mount at one extreme end of the actuation delivery mechanism, whereby mounting the actuation delivery mechanism to a subject at the pivot mount and at the other extreme end of the actuation delivery mechanism, causes the joint of the subject between the extreme ends of the actuation delivery mechanism to rotate upon actuation of the actuation delivery mechanism, and
    ii) a rotary drum mounted to the first part, and to which the cable is linked, the cable also being linked to the second part, whereby actuation of the actuation delivery mechanism causes the drum to rotate, thereby changing the distance between the drum and linkage of the cable to the second part and moving the first part relative to the second part along substantially parallel major longitudinal axes of the first and second parts;
  b) sensing at least one physiological feature of the subject while the subject or the actuation source is moving the joint; and
  c) modulating the actuation source to thereby modulate the actuation delivery mechanism and consequently modulating actuation of the joint in response to the physiologic feature sensed.

18. The method of claim 17, wherein force is delivered from the actuation source to the actuation delivery mechanism to thereby cause the joint to move.

19. The method of claim 18, wherein the movement of the joint is rotation of the joint.

20. The method of claim 17, wherein at least two actuation delivery mechanisms are fitted to the subject, whereby the actuation delivery mechanisms are modulated by respective remote actuation sources.

21. The method of claim 20, wherein the at least two actuation delivery mechanisms are fitted to different joints of a common limb of the subject.

22. The method of claim 20, wherein the at least two actuation delivery mechanisms are fitted to different limbs of the subject.

23. The method of claim 22, wherein the at least two actuation delivery mechanisms are fitted to corresponding joints on different limbs of the subject.

24. The method of claim 17, wherein the at least one physiological feature is sensed by at least on sensor selected from the group consisting of a pressure sensor, a temperature sensor, a motion sensor, a positioning locator, a heart rate sensor, a muscle electromyography sensor and a camera.

25. The method of claim 17, wherein the actuation source is supported independently of the subject.

26. The method of claim 17, wherein the subject is walking or running on a treadmill and the treadmill includes pressure sensors for detecting the footsteps of the subject in the treadmill, whereby information from the sensors modulates the actuation source.

27. The method of claim 26, wherein the pressure sensors detect at least one of force, pace and gait of the footsteps of the subject.

28. The method of claim 17, wherein the joint of the subject is selected from the group consisting of an ankle joint, a knee joint and a hip joint.

29. The method of claim 17, wherein the joint of the subject is selected from the group consisting of a shoulder joint, an elbow joint, a wrist joint, a finger joint and a shoulder joint.

30. The method of claim 29, wherein the actuation delivery mechanism includes a sensor selected for the group consisting of a torque sensor, an angle sensor and a position sensor, and wherein the actuation source modulates the actuation delivery mechanism in response to the sensor.

31. The method of claim 30, wherein the actuation delivery mechanism further includes at least one strain gauge, whereby force exerted during rotation of the joint of the subject can be measured, and whereby the actuation source modulates the actuation delivery mechanism in response to the measured force.

32. The method of claim 17, wherein the actuation delivery mechanism includes two pivot mounts, wherein each extreme end of the actuation delivery mechanism includes a pivot mount.

33. The method of claim 32, wherein the pivot mounts have axes of rotation that are substantially parallel.

34. The method of claim 32, wherein the pivot mounts have axes of rotation that are transverse.

35. The method of claim 17, wherein the actuation delivery mechanism includes a position sensor to indicate the relative positions of the first and second parts.

* * * * *